United States Patent
Gao et al.

(10) Patent No.: US 11,929,957 B2
(45) Date of Patent: Mar. 12, 2024

(54) METHODS AND USER EQUIPMENT FOR HANDLING COMMUNICATION

(71) Applicant: TELEFONAKTIEBOLAGET LM ERICSSON (PUBL), Stockholm (SE)

(72) Inventors: Shiwei Gao, Nepean (CA); Siva Muruganathan, Stittsville (CA); Robert Mark Harrison, Grapevine, TX (US); Stephen Grant, Pleasanton, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1172 days.

(21) Appl. No.: 16/304,179

(22) PCT Filed: May 23, 2017

(86) PCT No.: PCT/SE2017/050556
§ 371 (c)(1),
(2) Date: Nov. 23, 2018

(87) PCT Pub. No.: WO2017/204737
PCT Pub. Date: Nov. 30, 2017

(65) Prior Publication Data
US 2020/0322113 A1    Oct. 8, 2020

Related U.S. Application Data

(60) Provisional application No. 62/340,353, filed on May 23, 2016.

(51) Int. Cl.
*H04L 5/00* (2006.01)
*H04B 7/06* (2006.01)
*H04W 24/10* (2009.01)

(52) U.S. Cl.
CPC ......... *H04L 5/0057* (2013.01); *H04B 7/0626* (2013.01); *H04L 5/001* (2013.01); *H04L 5/0048* (2013.01); *H04W 24/10* (2013.01)

(58) Field of Classification Search
CPC . H04L 5/00; H04L 7/00; H04W 24/10; H04B 7/0626
See application file for complete search history.

(56) References Cited

U.S. PATENT DOCUMENTS 10,904,895 B2 * 1/2021 Nayeb Nazar .......... H04L 5/001
2010/0323720 A1 * 12/2010 Jen ........................ H04W 64/00
455/456.1
(Continued)

FOREIGN PATENT DOCUMENTS

CN        102237969 A    11/2011
CN        102812658 A    12/2012
(Continued)

OTHER PUBLICATIONS

Notification to Grant Patent Right for Invention issued by the Chinese Patent Office for Patent Application No. 201780045713.1—dated Dec. 15, 2021.
(Continued)

*Primary Examiner* — Yee F Lam
(74) *Attorney, Agent, or Firm* — BAKER BOTTS L.L.P.

(57) ABSTRACT

Embodiments herein show a method performed by a user equipment for handling communication via a set of serving cells comprising a first serving cell and a second serving cell of a communication network. The user equipment receives a grant on a first serving cell, wherein the grant comprises a first identifier identifying Channel State Information Reference Signal (CSI-RS) resources of the first serving cell. Furthermore, the user equipment calculates a first CSI report for the first serving cell using the CSI-RS resources identified by the first identifier; and calculates a second CSI report
(Continued)

for a second serving cell, using CSI-RS resources of the second serving cell identified by a second identifier, the second identifier being received previously in a grant on the second serving cell. The user equipment then transmits the first and second CSI reports to a network node serving the first serving cell.

13 Claims, 17 Drawing Sheets

(56) References Cited

U.S. PATENT DOCUMENTS

| | | | | |
|---|---|---|---|---|
| 2013/0021926 | A1* | 1/2013 | Geirhofer | H04L 5/0048 370/252 |
| 2013/0044707 | A1* | 2/2013 | Chen | H04W 72/123 370/329 |
| 2013/0301450 | A1* | 11/2013 | Geirhofer | H04L 5/0057 370/252 |
| 2013/0336214 | A1* | 12/2013 | Sayana | H04B 7/024 370/328 |
| 2014/0003345 | A1 | 1/2014 | Chu | |
| 2014/0044040 | A1* | 2/2014 | Chen | H04L 5/0094 370/328 |
| 2014/0233663 | A1* | 8/2014 | Kang | H04L 1/0072 375/260 |
| 2015/0029966 | A1* | 1/2015 | Park | H04L 5/0014 370/329 |
| 2015/0078271 | A1* | 3/2015 | Kim | H04L 5/0048 370/329 |
| 2015/0131560 | A1 | 5/2015 | Von Elbwart et al. | |
| 2015/0131568 | A1 | 5/2015 | You et al. | |
| 2015/0327106 | A1* | 11/2015 | Lee | H04L 43/065 370/252 |
| 2018/0287841 | A1* | 10/2018 | Subramanian | H04B 7/0626 |

FOREIGN PATENT DOCUMENTS

| | | |
|---|---|---|
| CN | 104365136 A | 2/2015 |
| CN | 105515712 A | 4/2016 |
| EP | 2 667 535 A1 | 11/2013 |
| WO | 2016 056970 A1 | 4/2016 |

OTHER PUBLICATIONS

3GPP TSG RAN WG1 Meeting #69; Prague, Czech Republic; Title: Multiple CSI Reports on PUCCH for DL Comp; Source: Alcatel-Lucent Shanghai Bell, Alcatel Lucent (R1-122888)—May 21-25, 2012.

3GPP TSG RAN WG1 Meeting #82; Beijing, China; Source: CATT; Title: CSI feedback for beamformed CSI-RS on PUSCH (R1-153946)—Aug. 24-28, 2015.

Chinese Summary of First Office Action issued for Application No. 201780045713.1—dated Dec. 28, 2020.

3GPP TS 36.212 v13.0.0; Technical Specification; 3rd Generation Partnership Project; Technical Specification group Radio Access Network; Evolved Universal Terrestrial Radio Access (E-UTRA); Multiplexing and channel coding (Release 13)—Dec. 2015.

3GPP TS 36.331 v13.0.0; Technical Specification; 3rd Generation Partnership Project; Technical Specification Group radio Access Network; Evolved Universal Terrestrial Radio Access (E-UTRA); Radio Resource Control (RRC); Protocol specification (Release 13)—Dec. 2015.

3GPP TS 36.211 v13.0.0; Technical Specification; 3rd Generation Partnership Project; Technical Specification Group Radio Access Network; Evolved Universal Terrestrial Radio Access (E-UTRA); Physical channels and modulation (Release 13)—Dec. 2015.

3GPP TS 36.213 v13.0.1; Technical Specification; 3rd Generation Partnership Project; Technical Specification Group Radio Access Network; Evolved Universal Terrestrial Radio Access (E-UTRA); Physical layer procedures (Release 13)—Jan. 2016.

3GPP TSG RAN WG1 #85; Nanjing, China; Source: Samsung; Title: On aperiodic CSI-RS design (R1-164773)—May 23-27, 2016.

3GPP TSG-RAN WG1#85; Source: Ericsson; Title: Hybrid CSI Reporting with One and Two CSI Processes (R1-165098)—May 23-27, 2016.

3GPP TSG-RAN WG1#85; Source: Ericsson; Title: Dynamic CSI-RS Design and Overhead Reduction (R1-165406)—May 23-27, 2016.

EPO Communication Under Rule 164(2)(b) and Rule 71(3) EPC issued for Application No. 17 729 210.9-1205—dated Apr. 1, 2022.

3GPP TSG RAN WG1 Meeting #84bis; Busan, Korea; Source: Huawei, HiSilicon; Title: Efficient utilization of BF CSI-RS (R1-162599)—Apr. 11-15, 2016.

3GPP TSG RAN WG1 Meeting #84bis; Busan, Korea; Source: Xinwei; Title: Considerations on Aperiodic CSI-RS (R1-163134)—Apr. 11-15, 2016.

PCT International Search Report issued for International application No. PCT/SE2017/050556—dated Aug. 7, 2017.

PCT Written Opinion of the International Searching Authority issued for International application No. PCT/SE2017/050556—dated Aug. 7, 2017.

* cited by examiner

METHODS AND USER EQUIPMENT FOR HANDLING COMMUNICATION

PRIORITY

This nonprovisional application is a U.S. National Stage Filing under 35 U.S.C. § 371 of International Patent Application Serial No. PCT/SE2017/050556 filed May 23, 2017 and entitled "METHODS AND USER EQUIPMENT FOR HANDLING COMMUNICATION" which claims priority to U.S. Provisional Patent Application No. 62/340,353 filed May 23, 2016 both of which are hereby incorporated by reference in their entirety.

TECHNICAL FIELD

The present disclosure relates, in general, to wireless communications and, more particularly, to a method and a user equipment for handling communication, such as communication of aperiodic CSI feedback.

BACKGROUND

FIG. 1 illustrates the basic Long Term Evolution (LTE) downlink physical resource. LTE uses Orthogonal Frequency Division Multiplexing (OFDM) in the downlink and Discrete Fourier Transform (DFT)-spread OFDM in the uplink. The basic LTE downlink physical resource can thus be seen as a time-frequency grid, where each resource element (RE), or time/frequency resource element (TFRE), corresponds to one OFDM subcarrier during one OFDM symbol interval.

FIG. 2 illustrates the LTE time-domain structure. In the time domain, LTE downlink transmissions are organized into radio frames of 10 ms. Each radio frame consists of ten equally-sized sub-frames of length $T_{sub-frame}=1$ ms. For normal cyclic prefix, one sub-frame consists of 14 OFDM symbols. The duration of each OFDM symbol is approximately 71.4 µs.

Furthermore, the resource allocation in LTE is typically described in terms of resource blocks (RBs), where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

FIG. 3 illustrates an example downlink sub-frame. Downlink transmissions are dynamically scheduled. In other words, in each sub-frame the base station transmits control information about to which terminals, or user equipment (UE) data is transmitted and upon which resource blocks the data is transmitted in the current downlink sub-frame. This control signaling, e.g. using a Physical Downlink Control Channel (PDCCH), is typically transmitted in the first 1, 2, 3 or 4 OFDM symbols in each sub-frame and the number n=1, 2, 3, or 4 is known as the Control Format Indicator (CFI). The downlink sub-frame also contains common reference symbols or signals, which are known to the receiver and used for coherent demodulation of, for example, the control information. For example, FIG. 3 illustrates a downlink system with 3 OFDM symbols as control.

From LTE Rel-11 onwards above described resource assignments can also be scheduled on the Enhanced Physical Downlink Control Channel (EPDCCH). For Rel-8 to Rel-10 only Physical Downlink Control Channel (PDCCH) is available.

The reference symbols (or signals) shown in FIG. 3 are the cell specific reference symbols (or signals) (CRS) and are used to support multiple functions including fine time and frequency synchronization and channel estimation for certain transmission modes.

In a cellular communication system there is a need to measure the channel conditions in order to know what transmission parameters to use. These parameters include, e.g., modulation type, coding rate, transmission rank, and frequency allocation. This applies to uplink (UL) as well as downlink (DL) transmissions.

The scheduler that makes the decisions on the transmission parameters is typically located in the base station, such as an eNB. Hence, it can measure channel properties of the UL directly using known reference signals that the terminals, also denoted user equipments (UEs), transmit. These measurements then form a basis for the UL scheduling decisions that the eNB makes, which are then sent to the UEs via a downlink control channel.

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The LTE standard is currently evolving with enhanced MIMO support. A core component in LTE is the support of MIMO antenna deployments and MIMO related techniques. Currently, up to 8-layer spatial multiplexing with 2, 4, 8, 16 1D Transmit (Tx) antenna ports and 8, 12, and 16 Tx 2D antenna ports is supported in LTE with channel dependent precoding. The spatial multiplexing mode is aimed for high data rates in favorable channel conditions.

FIG. 4 illustrates a transmission structure of precoded spatial multiplexing mode in LTE. As depicted, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

LTE uses OFDM in the downlink (and DFT precoded OFDM in the uplink) and hence the received $N_R \times 1$ vector $y_n$ over $N_R$ receiving antenna ports for a certain TFRE on subcarrier n (or alternatively data TFRE number n) is thus modeled by:

$$y_n = H_n W s_n + e_n$$

where $H_n$ is the channel matrix between eNB and a UE, W is the precoding matrix, $s_n$ is the transmitted symbol vector, and $e_n$ is a noise/interference vector. The precoder, W, can be a wideband precoder, which is constant over frequency, or frequency selective (i.e., different precoders on different subbands).

The precoder matrix is often chosen to match the characteristics of the $N_R \times N_T$ MIMO channel matrix $H_n$, resulting in so-called channel dependent precoding. This is also commonly referred to as closed-loop precoding, and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

The transmission rank, and thus the number of spatially multiplexed layers, is reflected in the number of columns of the precoder. For efficient performance, it is important that a transmission rank that matches the channel properties is selected.

In closed-loop DL MIMO, a UE typically estimates and reports back to eNB a channel rank indicator (RI), a preferred precoding matrix indicator (PMI), and a channel quality indicator (CQI) for each rank. Depending on the feedback mode configured, the PMI and the CQI can be for wideband or for each sub band or for both wideband and sub band, RI, PMI, and CQI together are referred to as the channel state information (CSI). In LTE Rel-8, cell-specific reference signals (CRSs) are used in DL for CSI estimation and feedback, and for channel estimation for demodulation. CRSs are transmitted in every sub-frame and are defined to support up to 4 antenna ports (AP). In LTE Rel-10, to support up to 8 APs, CSI reference signals (CSI-RS) are defined for UE to measure and feedback CSI using the multiple APs. Each CSI-RS resource consists of 2 Resource elements (RE) over 2 consecutive OFDM symbols, and 2 different CSI-RSs (for 2 different APs) can share the same CSI-RS resource (2 REs) by code division multiplexing (CDM). Also, CSI-RS can be transmitted with a transmission period of once per 5, 10, 20, 40 or 80 ms, called CSI-RS periodicity. Therefore, CSI-RS has lower overhead and lower duty-cycle when compared with CRS, on the other hand, CSI-RS is not used as a demodulation reference while CRS is. Different CSI-RS can also be transmitted with different offsets within a CSI-RS transmission period, called CSI-RS sub-frame offsets. When a CSI-RS is configured, the UE measures the channel for a given antenna port at each time instant and may interpolate the channel in between CSI-RS occasions to get the dynamically varying channel, e.g. with one interpolated sample per 1 ms instead of e.g. measured sample each 5 ms.

FIG. 5 shows examples of mappings from different CSI-RS configurations to REs in an RB pair. The left-hand part of FIG. 5 is the mapping for 1 or 2 APs, where 20 configurations are possible. The 2 CSI-RS of the 2 APs of a UE's serving cell can be transmitted by for instance configuration 0 by CDM, while CSI-RS of APs of neighboring cells can be transmitted by configuration j with $1 \le j \le 19$ to avoid RS collisions with the CSI-RS in the serving cell. The right-hand part of FIG. 5 is the mapping for 4 APs, where 10 configurations are possible. The 4 CSI-RS of the 4 APs of a serving cell can be transmitted by for instance configuration 0 by CDM, while CSI-RS of APs of neighboring cells can be transmitted by configuration j with $1 \le j \le 9$.

The OFDM symbols used by the 2 consecutive REs for one CSI-RS are Quadruple Phase Shift Keying (QPSK) symbols, which are derived from a specified pseudo-random sequence. To randomize the interference, the initial state of the pseudo-random sequence generator is determined by the detected cell Identity (ID) or a virtual cell ID configured to the UE by radio resource control (RRC) signaling. A CSI-RS with such non-zero-power OFDM symbols is called a non-zero-power CSI-RS (NZP CSI-RS). On the other hand, zero-power (ZP) CSI-RSs can also be RRC configured to the UE for the purpose of interference measurement (IM) (in transmission mode 10 only), or (in transmission mode 9 or 10) for the purpose of improving the CSI estimation in other cells; however, the CSI-RS mapping with 4 APs will always be used by the ZP CSI-RSs. For example, in FIG. 5, if configuration 0 with NZP CSI-RS is used by cell A to estimate the CSI of the 2 APs in cell A, configuration 0 with ZP CSI-RS (total 4 REs) can be used by the neighboring cell B to minimize the DL interference to cell A over the 2 REs in configuration 0, such that the CSI estimation of the 2 APs in cell A can be improved.

CSI-RS for 8, 12 and 16 antenna ports are also supported. CSI-RS for up to 32 antenna ports will be specified in LTE Release 14.

In LTE transmission mode 10 (TM10), up to four CSI processes can be configured for a UE by RRC signaling. These four CSI processes can for instance be used to acquire CSI for APs in up to 4 different cells (or transmission points (TPs) within the same cell) in the Coordinated Multipoint (CoMP) framework. They can also be assigned to multiple different beams transmitted from the same eNB using an array antenna that is capable of beamforming in azimuth, elevation, or both (Two-dimensional (2D) beamforming).

In order for the UE to derive the correct CSI, each CSI process in Transmission Mode 10 (TM10) is associated with a signal hypothesis and an interference hypothesis. The signal hypothesis describes which NZP CSI-RS reflects the desired signal. The interference is measured in a configured CSI-IM resource, which is similar to a CSI-RS with 4 REs per Physical Resource Block (PRB) pair, or RB pair, which the UE shall use for interference measurements. To better support the interference measurement (IM) in CoMP, CSI-IM is standardized and is based on the ZP CSI-RS. Therefore, each of the up to four CSI processes consists of one NZP CSI-RS and one CSI-IM.

For transmission mode 9 (TM9) UE, only a single CSI process can be configured, and no CSI-IM is defined. The interference measurement is thus unspecified in TM9. There is however still a possibility to get CSI feedback from two different sub-frame (SF) sets: SF set 1 and SF set 2. For instance, based on e.g. the reduced power sub-frame (RPSF) information signaled over X2, the pico eNB can configure a UE to feedback CSI for both protected (i.e. RPSF) sub-frames (where the macro has reduced activity) and CSI for unprotected sub-frames in two different CSI reports. This gives the pico eNB information to perform link adaptation in the two types of sub-frames differently, depending on whether it is a protected sub-frame or not.

It is also possible for a UE configured in TM10 to use both sub-frame sets and multiple CSI processes.

In LTE, the format of the CSI reports are specified in detail and may contain Channel-Quality Indicator (CQI), Rank Indicator (RI), and Precoding Matrix Indicator (PMI). See ref. 3GPP TS 36.213 v13.0.0. The reports can be wideband or applicable to subbands. They can be configured by a radio resource control (RRC) message to be sent periodically or in an aperiodic manner, triggered by a control message from the eNB to the UE. The quality and reliability of the CSI are crucial for the eNB in order to make the best possible scheduling decisions for the upcoming DL transmissions.

Codebook of up to 16 antenna ports has been defined in LTE. Both one dimension (1D) and two-dimension (2D) antenna array are supported. For LTE Rel-12 UE and earlier, only a codebook feedback for a 1D port layout is supported, with 2, 4 or 8 antenna ports. Hence, the codebook is designed assuming these ports are arranged on a straight line. In LTE Rel-13, codebooks for 2D port layouts were specified for the case of 8, 12, or 16 antenna ports. In addition, a codebook 1D port layout for the case of 16 antenna ports was also specified in LTE Rel-13.

In LTE Rel-13, two types of CSI reporting were introduced, i.e. Class A and Class B. In Class A CSI reporting, the UE measures and reports CSI based on a new codebook for the configured 2D antenna array with 8, 12 or 16 antenna ports. The CSI consists of an RI, a PMI and a CQI or CQIs, similar to the CSI reporting used before Rel-13.

In Class B CSI reporting, in one scenario (also referred to as "K>1"), the eNB may pre-form multiple beams in one antenna dimension. There can be multiple ports (1, 2, 4, or 8 ports) within each beam on the other antenna dimension. "beamformed" CSI-RS are transmitted along each beam. The UE first selects the best beam from a group of beams configured and then measures CSI within the selected beam based on the legacy codebook for 2, 4, or 8 ports. The UE then reports back the selected beam index and the CSI corresponding to the selected beam. In another scenario (also referred to as "K=1"), the eNB may form up to 4 (2D) beams on each polarization and "beamformed" CSI-RS is transmitted along each beam. A UE measures CSI on the "beamformed" CSI-RS and feeds back CSI based on a new Class B codebook for 2, 4, or 8 ports.

Prior to Release 13, the LTE standard does not specify how the UE should obtain and average the CSI-RS and CSI-IM measurements from multiple time instants, i.e. sub-frames. For example, the UE may measure over a time frame unknown to the eNB and combine several measurements in a UE-proprietary way to create the CSI-values that are reported, either periodically or triggered.

Measurement restriction was introduced in Release 13, in which a UE can be configured to measure CSI only in a single sub-frame.

In the context of LTE, the available CSI-RS are referred to as "CSI-RS resources". In addition, there are also "CSI-IM resources", where IM stands for "Interference Measurement". The latter are defined from the same set of possible physical locations in the time/frequency grid as the CSI-RS, but with zero power (ZP), hence ZP CSI-RS. In other words, they are "silent" CSI-RS and when the eNB is transmitting the shared data channel, it avoids mapping data to those resource elements used for CSI-IM. These are intended to give a UE the possibility to measure the power of any interference from another transmitter than its serving node.

Each UE can be configured with one, three or four different CSI processes. Each CSI process is associated with one CSI-RS and one CSI-IM where these CSI-RS resources have been configured to the UE by RRC signaling and are thus periodically transmitted/occurring with a periodicity of T and with a given sub-frame offset.

If only one CSI process is used, then it is common to let the CSI-IM reflect the interference from all other eNBs, i.e. the serving cell uses a ZP CSI-RS that overlaps with the CSI-IM, but in other adjacent eNBs, there is no ZP CSI-RS on these resources. In this way, the UE will measure the interference from adjacent cells using the CSI-IM.

If additional CSI processes are configured to the UE, then there is possibility for the network to also configure a ZP CSI-RS in the adjacent eNB that overlaps with a CSI-IM for this CSI process for the UE in the serving eNB. In this way, the UE will feed back accurate CSI also for the case when this adjacent cell is not transmitting. Hence coordinated scheduling between eNBs is enabled with the use of multiple CSI processes, where one CSI process feeds back CSI for full interference case and the other CSI process feeds back CSI for the case when a (strong interfering) adjacent cell is muted. As mentioned above, up to four CSI processes can be configured to the UE, thereby enabling feedback of four different transmission hypotheses.

The PDCCH and the EPDCCH are used to carry downlink control information (DCI) such as scheduling decisions and power-control commands. More specifically, the DCI includes:

Downlink scheduling assignments, including Physical Downlink Shared Channel (PDSCH) resource indication, transport format, hybrid-Automatic Repeat Request (ARQ) information, and control information related to spatial multiplexing (if applicable). A downlink scheduling assignment also includes a command for power control of the Physical Uplink Control Channel (PUCCH) used for transmission of hybrid-ARQ acknowledgements in response to downlink scheduling assignments.

Uplink scheduling grants, including Physical Uplink Shared Channel (PUSCH) resource indication, transport format, and hybrid-ARQ-related information. An uplink scheduling grant also includes a command for power control of the PUSCH.

Power-control commands for a set of terminals as a complement to the commands included in the scheduling assignments/grants.

One PDCCH or EPDCCH carries one DCI message with one of the formats above. As multiple terminals can be scheduled simultaneously, on both downlink and uplink, there must be a possibility to transmit multiple scheduling messages within each sub-frame. Each scheduling message is transmitted on separate PDCCH or EPDCCH resources, and consequently there are typically multiple simultaneous PDCCH or EPDCCH transmissions within each cell. Furthermore, to support different radio-channel conditions, link adaptation can be used, where the code rate of the PDCCH or EPDCCH is selected by adapting the resource usage for the PDCCH or EPDCCH, to match the radio-channel conditions.

An uplink grant can be sent using either DCI format 0 or DCI format 4, depending on the uplink transmission mode configured. For UEs supporting uplink MIMO transmission, DCI format 4 is used. Otherwise, DCI format 0 is used. For uplink data transmission on the Physical Uplink Shared Channel (PUSCH), a Demodulation Reference Signal (DMRS) is used for channel estimation at the eNB receiver. Two OFDM symbols are dedicated for transmitting DMRS, one in each slot of an uplink sub-frame. A DMRS sequence is defined by a cyclic shift of a base sequence and a length 2 orthogonal cover code (OCC) across the two slots of an uplink sub-frame. When MIMO is supported in the uplink, a separate DMRS sequence is needed for each MIMO layer. Up to 4 layers are supported in uplink MIMO, thus up to four DMRS sequences and OCC codes are needed. The cyclic shifts and OCC codes are dynamically signaled in DCI format 0 or DCI format 4 through a Cyclic Shift Field of 3 bits. This field is used to indicate a cyclic shift parameter, $n_{DMRS,\lambda}^{(2)}$, and a length 2 OCC code, $w^\lambda$, where $\lambda=0, 1, \ldots, v-1$ and v is the number of layers to be transmitted in the PUSCH scheduled by the DCI. The exact mapping is shown in Table 5.5.2.1.1-1 of 3GPP technical specification 36.211 v13.0.0, also provided as Table 1 below.

Up to 4 (v=4) layers of PUSCH transmission are supported in the uplink. Each layer has an associated DMRS sequence specified by a cyclic shift and a length 2 OCC code if OCC for DMRS is activated. $n_{DMRS,\lambda}^{(2)}$ is used to derive the cyclic shift of DMRS for PUSCH. Table 1 illustrates a mapping of cyclic shift field in uplink-related DCI format to) $n_{DMRS,\lambda}^{(2)}$ and $[w^{(\lambda)}(0) \; w^{(\lambda)}(1)]$ in LTE:

TABLE 1

| Cyclic Shift Field in uplink-related DCI format | $n_{DMRS,\lambda}^{(2)}$ | | | | $[w^{(\lambda)}(0)\ w^{(\lambda)}(1)]$ | | | |
|---|---|---|---|---|---|---|---|---|
| [3] | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

An aperiodic CSI request is indicated in the CSI Request field in DCI format 0 or DCI format 4. The number of bits in the field varies from 1 bit to 3 bits, depending on UE configuration. For example, for UEs configured with 1 to 5 carriers (or cells) and/or multiple CSI-RS processes, 2 bits are used, and for UEs configured with more than 5 carriers, 3 bits are used. In case that a UE is configured with a single carrier (i.e. serving cell c) and 2 sets of CSI-RS processes, the CSI request field for PDCCH/EPDCCH with uplink DCI format 0 to 4 in UE specific search space is shown in Table 2:

TABLE 2

| Value of CSI request field | Description |
|---|---|
| '00' | No aperiodic CSI report is triggered |
| '01' | Aperiodic CSI report is triggered for a set of CSI process(es) configured by higher layers for serving cell$_c$ |
| '10' | Aperiodic CSI report is triggered for a 1$^{st}$ set of CSI process(es) configured by higher layers |
| '11' | Aperiodic CSI report is triggered for a 2$^{nd}$ set of CSI process(es) configured by higher layers |

In LTE release 13, up to 16 antenna ports are supported. Generally, a CSI-RS resource of N REs per PRB is associated with N antenna ports. In release 14, up to 32 antenna ports are to be supported. A large number of CSI-RS REs are needed if CSI-RS is transmitted on each antenna element of a large antenna array. This can have disadvantages, such as reduced CSI-RS coverage range due to lower transmit power per antenna port, higher UE complexity to compute CSI feedback, and higher CSI-RS resource overhead. Consequently, in Rel-13 support for beamformed CSI-RS was introduced, wherein CSI-RS are generally transmitted with narrower antenna beam patterns than full cell coverage. This can be contrasted with the non-precoded CSI-RS operation used in prior LTE releases, wherein CSI-RS generally was transmitted with antenna beam patterns with full cell coverage. Beamformed CSI-RS can be used to increase array gain for CSI-RS transmissions (improving coverage), reduce the number of ports needed in CSI feedback, as well as to reduce the CSI-RS overhead.

In Release 13, non-precoded and beamformed CSI-RS operation is supported through CSI processes and/or CSI-RS resources configured as 'Class A', or 'Class B', respectively. Dynamic beamforming is supported by channel measurement restriction which restricts the UE to measure CSI-RS in one sub-frame only, so that the UE won't average CSI when the beamforming on the CSI is changing across sub-frames. Channel measurement restriction is only supported for Class B operation in LTE Rel-13.

A UE configured for Class B operation can be configured with up to 8 CSI-RS resources, with up to 8 ports in each CSI resource, in one CSI process in LTE Rel-13. Such a UE can be configured to report a CSI-RS resource indicator (CRP) to indicate which of the CSI-RS resources (or beams) it will best be served upon. The UE then provides CQI, RI, and/or PMI only for the best CSI-RS resource (or beam).

A UE configured for Class B operation with 1 CSI-RS resource may use a port selection and cophasing codebook wherein the UE selects a subset of the CSI-RS ports and cophasing coefficients that combine the selected ports. This is identified in the layer 1 LTE specs with 'alternativeCodebookEnabledCLASSB_K1', and has been referred to as a 'W2-only' codebook in LTE contributions in 3GPP RAN1.

When a large number of CSI-RS ports are used for Class A or Class B operation, the overhead may be significant. One approach that was proposed to reduce this overhead was to transmit Class A CSI-RS over a full set of antenna ports infrequently, and multiple Class B CSI-RS over a smaller number of beamformed ports frequently between two Class A CSI-RS transmissions. The PMI feedback associated with Class A CSI-RS transmission is then used to select the precoder to precode the Class B CSI-RS. This use of both Class A and Class B CSI-RS is called 'Hybrid' CSI reporting. By using Class A to measure the channel to each element of the antenna array, the beamforming weights used for Class B can be determined accurately and with low eNB complexity. The use of Class B with a small number of ports allows reduced CSI feedback overhead and limits UE CSI computational complexity.

Since the precoding of Class B CSI-RS is UE specific and can be different for different UEs, only UEs in the same proximity may be able to share the same Class B CSI-RS resource in the same sub-frame. UEs having different Class B CSI-RS precoding may need to measure CSI in different sub-frames in which the Class B CSI-RS is precoded for the corresponding UEs. However, a large CSI feedback delay can occur when a large number of UEs are active (e.g. eNB has data to transmit to the UEs) and CSI feedback from each UE is needed. Large feedback delay can cause channel mismatch due to UE mobility and thus degradation of performance of a communication network.

SUMMARY

An object of embodiments herein is to provide a mechanism to improve the performance of a communication network.

The object is achieved by providing a method performed by a user equipment for handling communication via a set of serving cells comprising a first serving cell and a second serving cell of a communication network The UE receives a grant on a first serving cell, wherein the grant comprises a first identifier identifying at least one CSI-RS resource of the first serving cell. The UE further calculates a first CSI report for the first serving cell using the at least one CSI-RS resource identified by the first identifier; and a second CSI report for a second serving cell, using at least one CSI-RS resource of the second serving cell identified by a second identifier, the second identifier being received previously in a grant on the second serving cell. The UE then transmits the first and second CSI reports to a network node serving the first serving cell.

The object is further achieved by providing a user equipment for handling communication via a set of serving cells comprising a first serving cell and a second serving cell of a communication network The UE is configured to receive a grant on a first serving cell, wherein the grant comprises a first identifier identifying at least one CSI-RS resource of the first serving cell. The UE is further configured to calculate a first CSI report for the first serving cell using the at least one CSI-RS resource identified by the first identifier; and a second CSI report for a second serving cell, using at least one CSI-RS resource of the second serving cell identified by a second identifier. The second identifier has been received previously in a grant on the second serving cell. The UE is further configured to transmit the first and second CSI reports to a network node serving the first serving cell.

Certain embodiments herein may provide one or more technical advantages. As one example, one benefit of certain embodiments may be that there is no additional overhead to identify the CSI-RS resource to measure in an aperiodic CSI reporting request. Another technical advantage of certain embodiments may be that CSI-RS resource allocation efficiency is increased when the UE reports CSI for multiple downlink cells. These benefits translate to lower downlink overhead, and therefore more resources available for downlink transmission. Another benefit of some embodiments is that UE CSI computational complexity to compute CSI reports for multiple cells is reduced.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
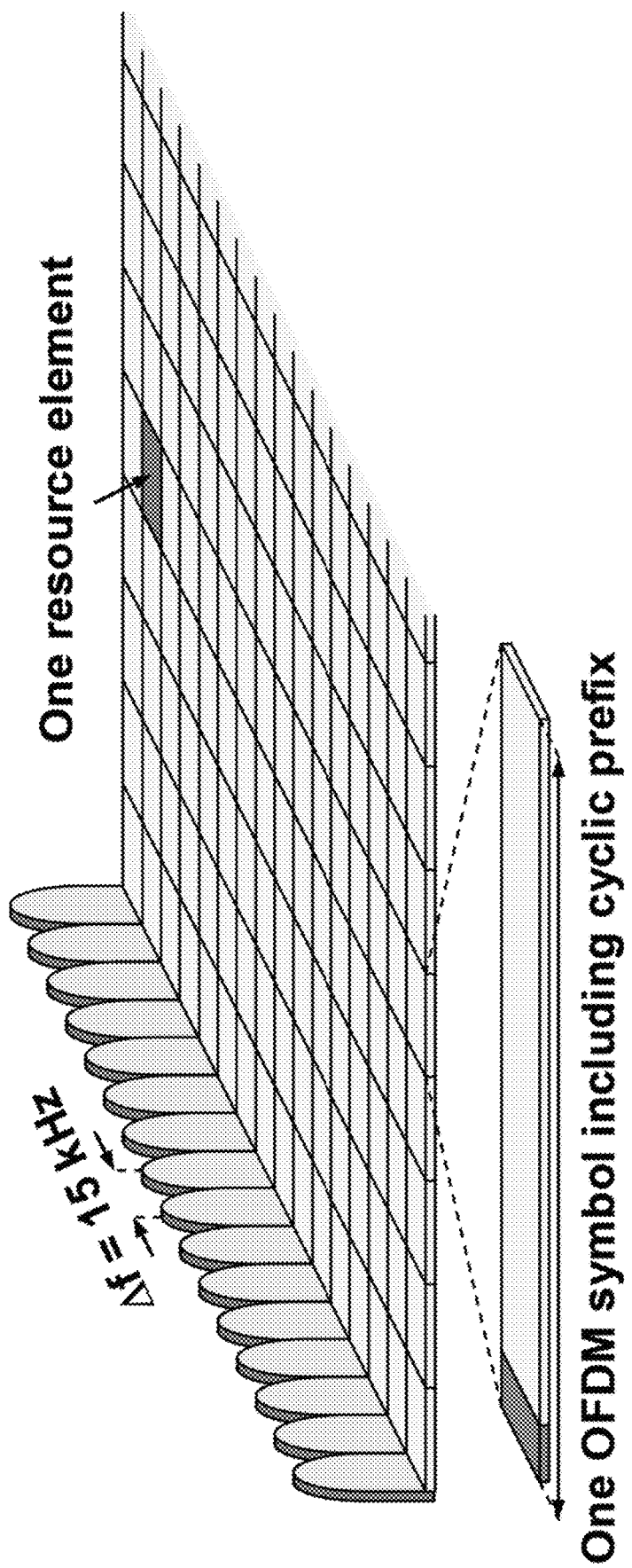
FIG. 1 illustrates the basic LTE downlink physical resource.
Figure 2:
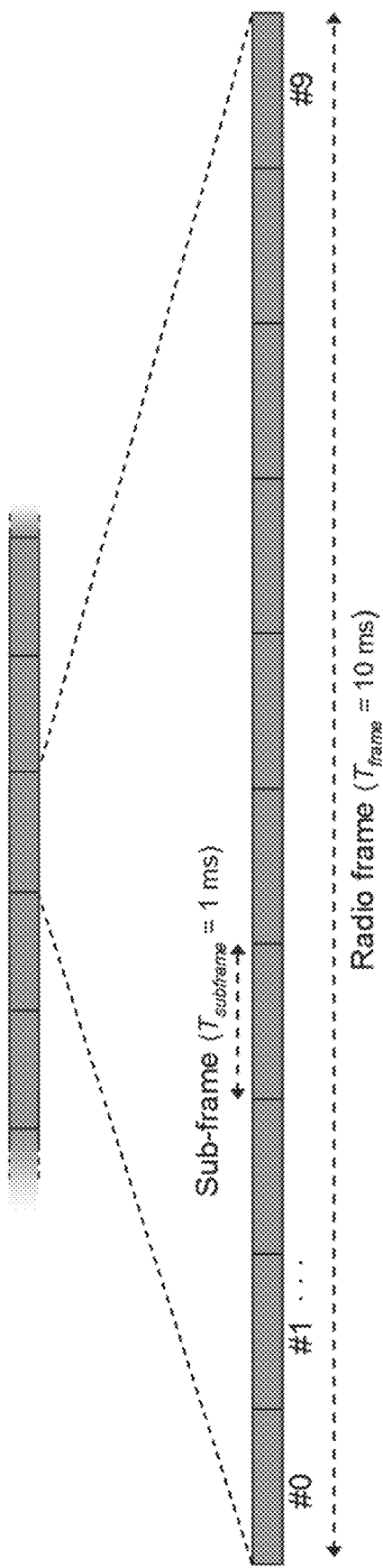
FIG. 2 illustrates the LTE time-domain structure.
Figure 3:
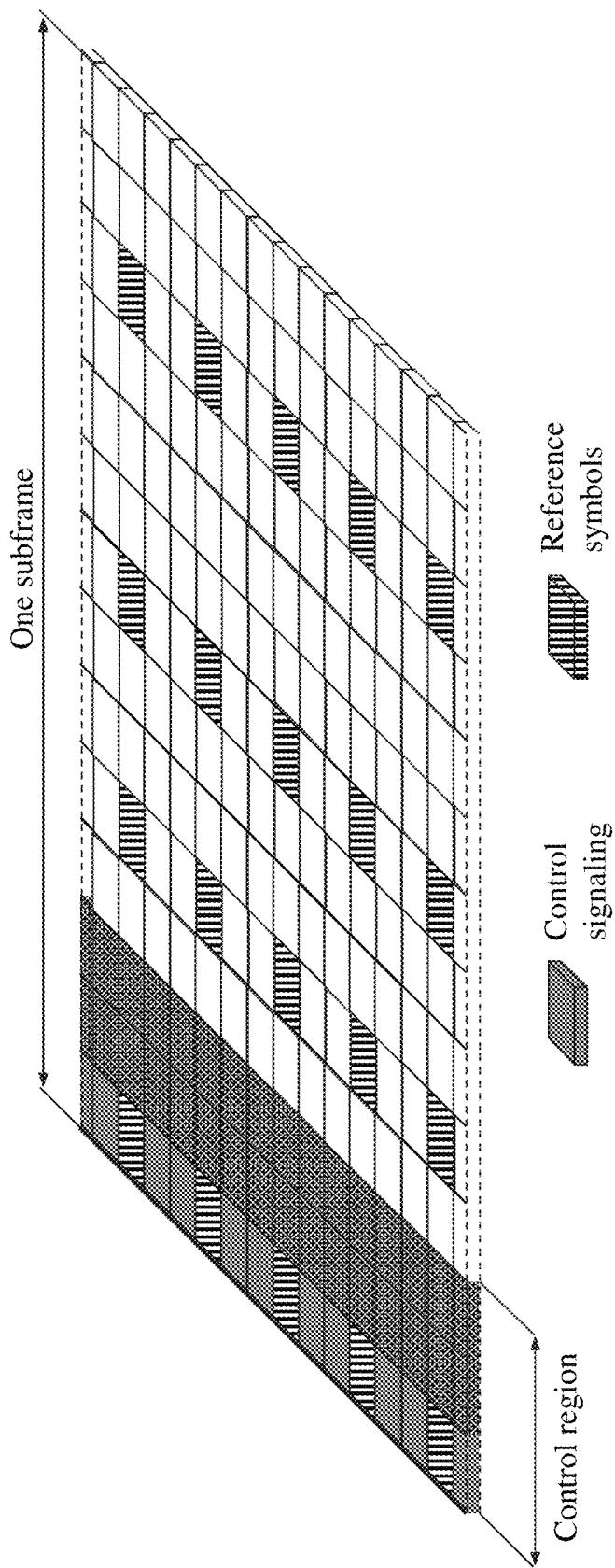
FIG. 3 illustrates an example downlink sub-frame.
Figure 4:
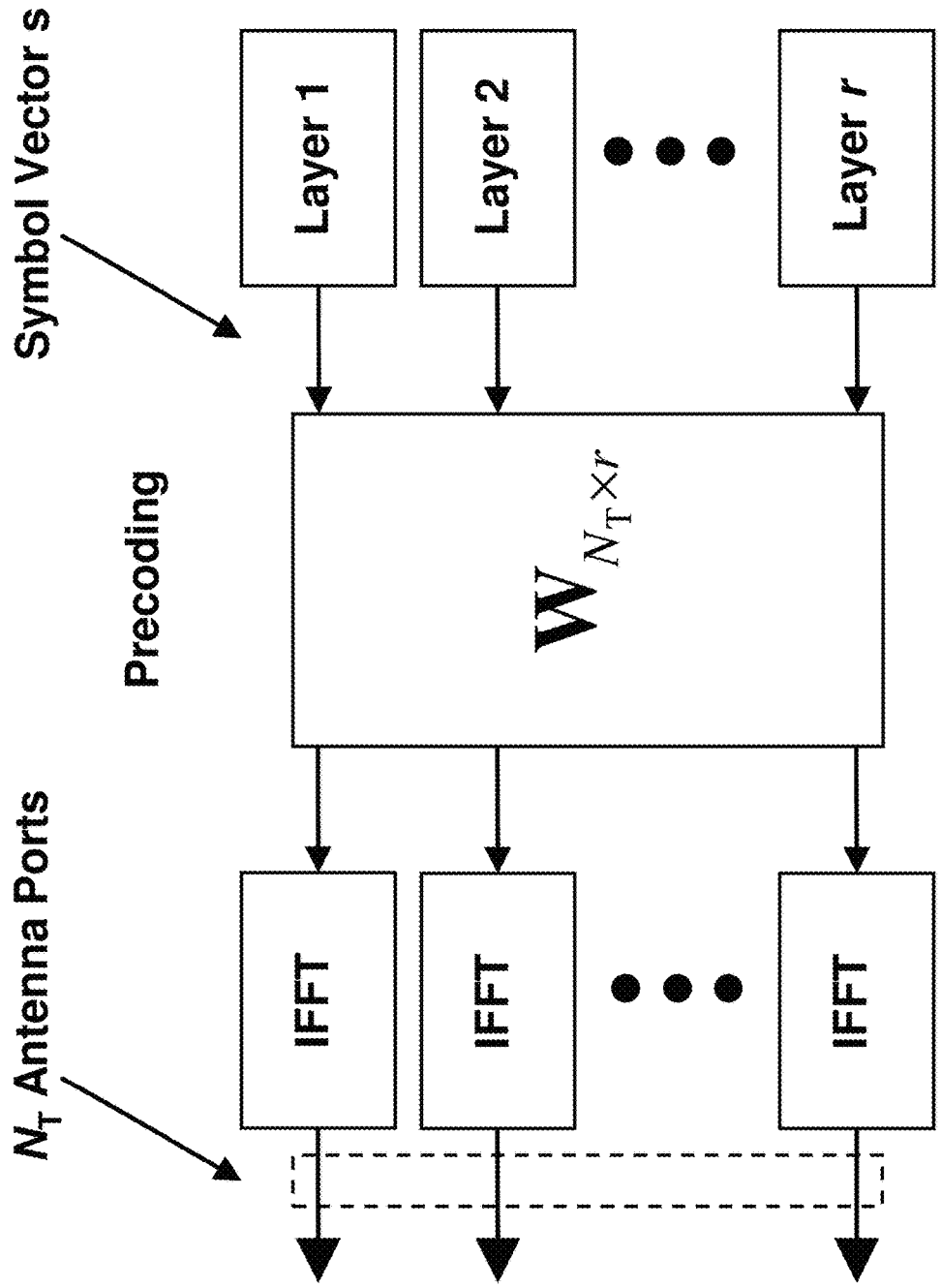
FIG. 4 illustrates an example of spatial multiplexing operation.
Figure 5:
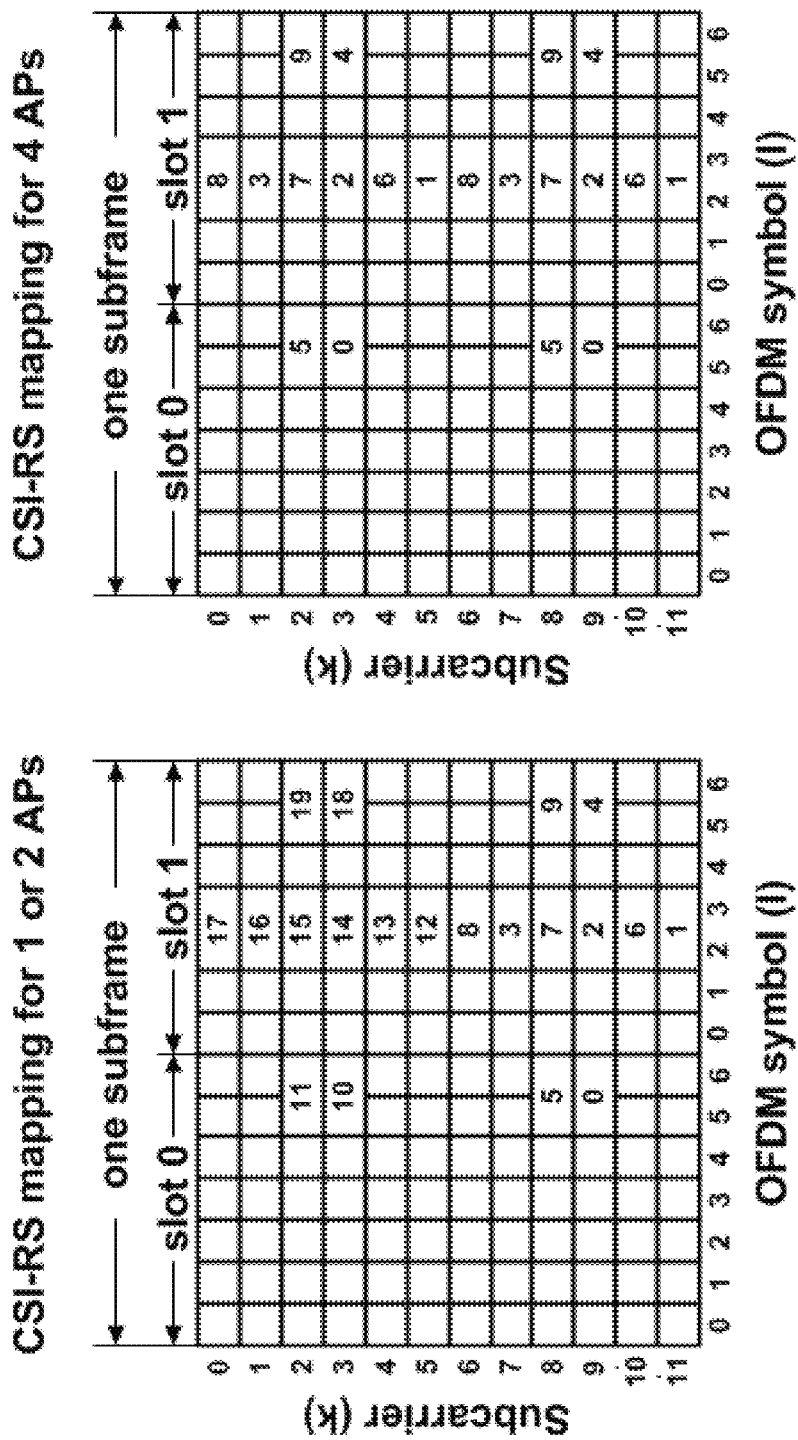
FIG. 5 illustrates configurations of CSI-RS for different numbers of antenna ports.

One way to mitigate the problem of large feedback delay in the hybrid CSI reporting scheme is that the eNB may configure a UE with a set of K CSI-RS resources by higher layer signaling, e.g. by using an RRC message, for aperiodic CSI reporting. The CSI-RS are either periodically transmitted, potentially with different periodicities, or can be transmitted in any sub-frame containing an uplink grant with aperiodic CSI report trigger or request. The K resources may correspond to K different beam directions as seen from the eNB. In this case, the eNB indicates to the UE in the uplink scheduling grant, one of the K CSI-RS resources to be used by the UE to perform channel measurement and CSI report in the scheduled PUSCH. A CSI report transmitted on the uplink from the UE is then computed using measurements on the single CSI-RS out of the set of K possible CSI-RS. Since a single report and a single CSI process is used, the UE complexity is reduced compared to using multiple CSI processes.

When multiple CSI-RS resources are configured for a UE, extra bits are needed in an uplink grant (either DCI format 0 or DCI format 4) for indicating which CSI-RS resource over which the UE is to measure CSI. For example, if 8 resources are configured, then 3 bits are needed for the purpose. Since the size of either DCI format 0 or DCI format 4 needs to be fixed, the 3 bits would then be present for every UL grant even for data scheduling when CSI is not triggered. This can result in more PDCCH or EPDCCH overhead.

Solutions that allocate CSI-RS resources in one grant for C cells in an aperiodic CSI report must support allocating C times more CSI-RS resources, resulting in higher PDCCH or EPDCCH overhead or less efficient CSI-RS allocation than for one cell.

Solutions where the UE measures CSI-RS in the sub-frame in which a grant is transmitted and where the UE reports CSI for K>1 cells require the network to have CSI-RS available on all cells in that sub-frame. This reduces the flexibility and efficiency of CSI-RS resource allocation, and also increases the peak CSI computational requirements for the UE because the UE must compute all K CSI reports simultaneously.

Thus, a need exists for identifying a CSI-RS resource to measure in an aperiodic CSI reporting request that does not require additional overhead.

According to certain embodiments, when the UE is configured for downlink carrier aggregation, the UE may be semi-persistently assigned CSI-RS resources. When the UE receives a grant transmitted on a cell of a carrier that identifies CSI-RS resources to use, it uses the CSI-RS resources for that cell when calculating CSI until it receives another grant transmitted on that cell identifying CSI-RS resources to use for that cell. In this way, when the grants only allocate resources for a single cell at a time and when the UE is triggered to report CSI on more than one cell, the eNB can dynamically allocate CSI-RS resources for cells other than the cell on which the UE receives a grant. This increases the number of CSI-RS resources that can be allocated on each cell. In some 'instant timing' embodiments, a UE measures CSI-RS resources in the sub-frame when, and on the cell where, a grant identifying the CSI-RS resource is given, but can periodically measure CSI-RSs on cells other than the one where the grant is transmitted.

As an example, further discussed below, the existing 3 bits used for signaling cyclic shifts of DMRS in PUSCH in DCI format 0 and DCI format 4 may be reused, i.e. the same 3 bits may be used for both cyclic shifts and, if CSI is triggered, also for CSI-RS resource indication. In other words, CSI-RS resource for aperiodic CSI measurement in a sub-frame may be linked to the cyclic shifts allocation in an uplink grant.

Figure 6A:
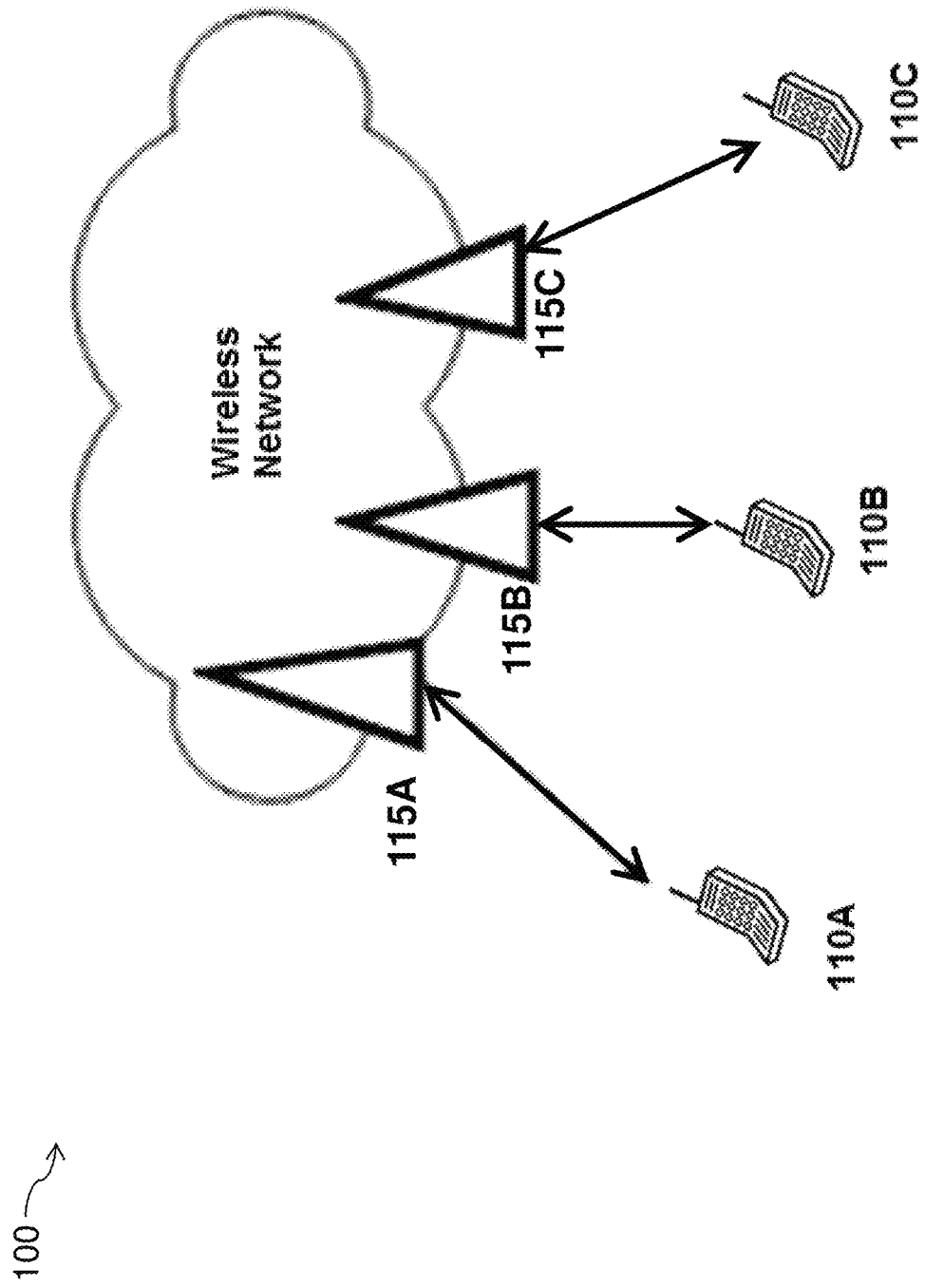
FIG. 6A is a block diagram illustrating an embodiment of a network, in accordance with certain embodiments.

FIG. 6A is a block diagram illustrating an embodiment of a network 100, in accordance with certain embodiments. Network 100 includes one or more wireless devices 110A-C, which may be interchangeably referred to as wireless devices 110 or UEs 110, and network nodes 115A-C, which may be interchangeably referred to as network nodes 115 or eNodeBs 115. Wireless devices 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capabilities. Thus, wireless devices 110 may be able to receive signals from and/or transmit signals directly to another wireless device. For example, wireless device 110A may be able to receive signals from and/or transmit signals to wireless device 110B.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Example embodiments of wireless devices 110, network nodes 115, and other network nodes (such as radio network controller or core network node) are described in more detail with reference to FIGS. 7, 8, and 13, respectively.

Although FIG. 6A illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to next generation mobile wireless communication system (5G) such as 3GPP new radio (NR), as well as to LTE, LTE-Advanced, UMTS, HSPA, GSM, cdma2000, WiMax, WiFi, another suitable radio access technology, or any suitable combination of one or more radio access technologies. In particular, next generation mobile wireless communication system (5G) or new radio (NR), will support a diverse set of use cases and a diverse set of deployment scenarios where embodiments described herein will be applicable. Although certain embodiments may be described in the context of wireless transmissions in the downlink, the present disclosure contemplates that the various embodiments are equally applicable in the uplink.

Figure 6B:
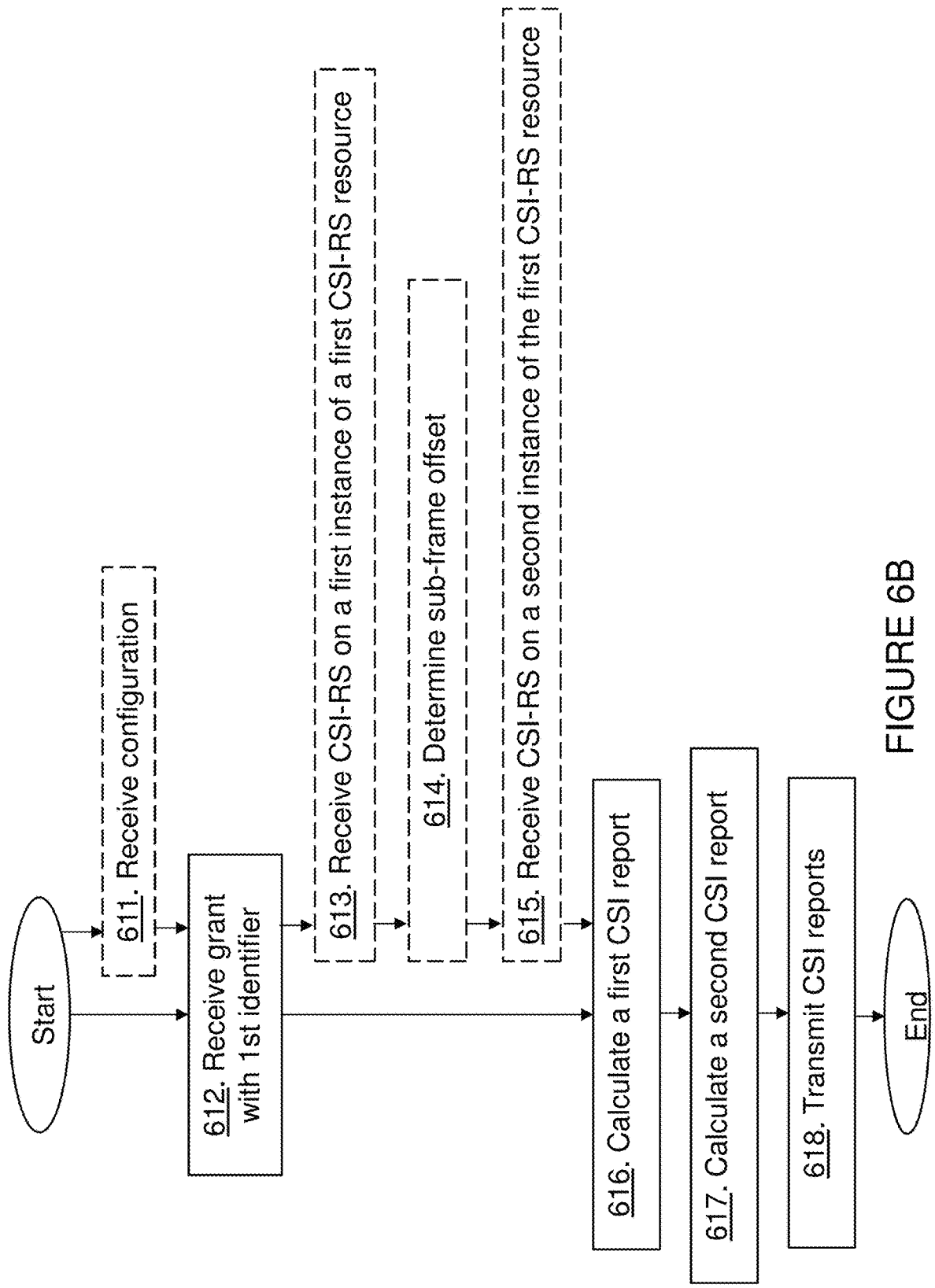
FIG. 6B is a flowchart depicting a method performed by a UE according to embodiments herein.

The method actions performed by the UE 110 for handling communication, e.g. handling a-periodic CSI reporting, via a set of serving cells comprising a first serving cell and a second serving cell of a communication network according to embodiments herein will now be described with reference to a flowchart depicted in FIG. 6B. The actions do not have to be taken in the order stated below, but may be taken in any suitable order. Actions performed in some, but not necessarily all, embodiments are marked with dashed boxes. The communication network comprises multiple cells using CSI-RS resources and the UE 110 is served by a number of serving cells in the communication network, e.g. the first and the second serving cells. The UE 110 may be configured to measure on multiple serving cells, and may report CSI for a subset of the serving cells, e.g. the first and the second serving cells, in a given CSI report, such as an aperiodic CSI report triggered in an uplink grant.

Action 611. The UE 110 may receive a configuration of a plurality of CSI-RS resources corresponding to the set of serving cells, the plurality of CSI-RS resources of the configuration comprising CSI-RS resources applicable for the first serving cell and CSI-RS resources applicable for the second serving cell. Thus, the configuration configures respective CSI-RS resources for the serving cells, and each CSI-RS resource is identified by a respective identifier. The CSI-RS resources of the configuration may thus comprise CSI-RS resources identified by a first identifier for the first serving cell and CSI-RS resources identified by a second identifier for the second serving cell.

Action 612. The UE 110 receives a grant on the first serving cell, wherein the grant comprises the first identifier identifying at least one CSI-RS resource of the first serving cell. The at least one CSI-RS resource identified by the first identifier is selected from among the CSI-RS resources applicable for the first serving cell. The at least one CSI-RS resource identified by the first identifier may be a first CSI-RS resource.

Action 613. The UE 110 may receive CSI-RS on a first instance of the first CSI-RS resource at a first time instant, e.g. in a first sub-frame, according to the first identifier.

Action 614. The UE 110 may determine a sub-frame offset from a sub-frame number of the first sub-frame and a sub-frame periodicity.

Action 615. The UE 110 may further receive CSI-RS on a second instance of the first CSI-RS resource transmitted on the first serving cell at a second time instant, e.g. in a second sub-frame according to the sub-frame offset and the sub-frame periodicity. In this way, a timing of the first CSI-RS resource may be determined, i.e. it may be determined at what time instants, e.g. in terms of subframes, CSI-RS intended for the UE will be transmitted on the first CSI-RS resource. The sub-frame offset, sub-frame number and sub-frame periodicity may be a sub-frame offset, sub-frame number and sub-frame periodicity related to the first serving cell. A timing of a second CSI-RS resource identified by the second identifier for the second cell may be correspondingly determined by the UE receiving CSI-RS on one instance of the second CSI-RS resource at one time instant or sub-frame related to the second cell and determining a sub-frame offset of the second cell from a sub-frame number of the sub-frame related to the second cell and a sub-frame periodicity of the second cell and then receive CSI-RS on a further instance of the second CSI-RS resource transmitted on the second serving cell at a further time instant, e.g. in a further sub-frame according to the sub-frame offset and the sub-frame periodicity of the second cell.

Action 616. The UE 110 calculates a first CSI report for the first serving cell using the at least one CSI-RS resource identified by the first identifier.

Action 617. The UE 110 calculates a second CSI report for a second serving cell, using at least one CSI-RS resource of the second serving cell identified by the second identifier, the second identifier being received previously, i.e. prior to the reception of the grant on the first cell as of Action 612, in a grant on the second serving cell. The at least one CSI-RS resource identified by the second identifier is selected from among the CSI-RS resources applicable for the second serving cell. The second identifier for the second serving cell may be received at a prior time instant, e.g. in a prior sub-frame, the prior time instant or sub-frame being prior to a first time instant or sub-frame where the first identifier of the first serving cell is received. The calculation of the second CSI report may be preceded by a measurement on the CSI-RS transmitted on the at least one CSI-RS resource identified by the second identifier that is made at a most recent occasion after that the grant on the second cell was received, but it may take some time after receiving a grant to calculate a new report, and so in some cases (and probably with semi-persistent CSI reporting) a new report may be calculated using measurements of older CSI-RS than the most recent CSI-RS after the grant. The at least one CSI-RS resource identified by the second identifier may be the second CSI-RS resource discussed in Action 615 above.

Action 618. The UE 110 transmits the first and second CSI reports to a network node serving the first serving cell. The first and second CSI reports are transmitted together in response to an aperiodic CSI report trigger or request triggering the UE to report CSI on more than one cell, e.g. more than one serving cell. The aperiodic CSI report trigger or request may for example have been received by the UE with, or comprised in, the grant on the first serving cell in Action 612. Thus the UE 110 transmits the reports in a UL transmission occasion that occurs after receiving the grant on the first serving cell. The first and second reports may be transmitted at a later time instant, e.g. in a later sub-frame, following the first time instant, e.g. the first sub-frame. The later sub-frame may be any sub-frame following after the first sub-frame.

Each one of the first and the second identifiers may identify at least one of: a CSI-RS resource; and a CSI-Interference Measurement, IM, resource, also referred to as CSI-RS resource configuration and CSI-IM resource configuration.

Figure 6C:
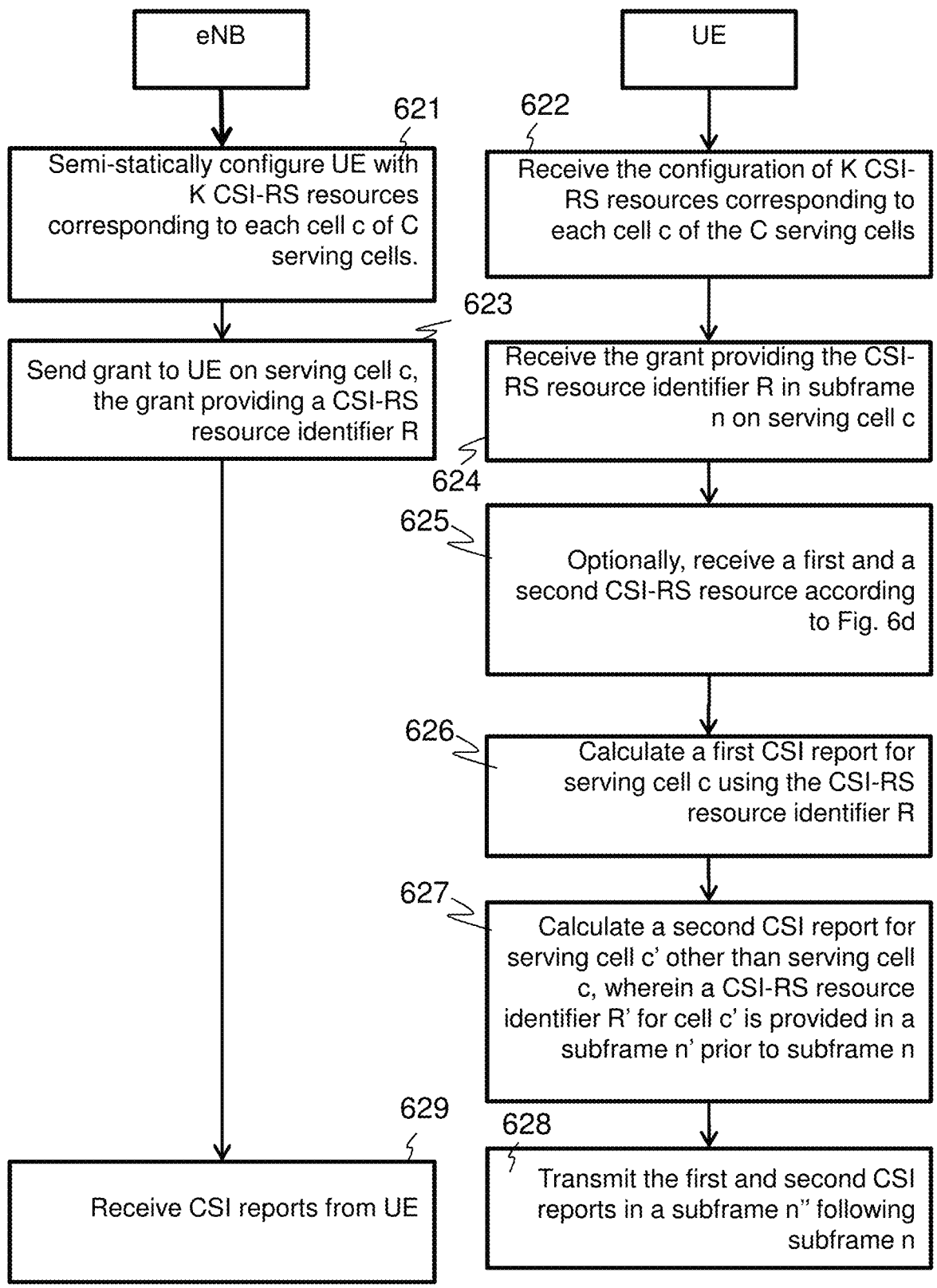
FIG. 6C is a flowchart depicting a method performed by a UE according to embodiments herein.

FIG. 6C is a combined flowchart depicting actions performed in the network node, exemplified herein as an eNB serving the user equipment as well as actions performed by the user equipment according to some embodiments herein. In the following description, the C serving cells correspond to the set of serving cells discussed above and the K CSI-RS resources may correspond to the plurality of CSI-RS resources comprising CSI-RS resources applicable for the first serving cell and CSI-RS resources applicable for the second serving cell, or, alternatively, may correspond to, for cell c being the first serving cell, the CSI-RS resources applicable for the first serving cell, and for cell c being the second serving cell, the CSI-RS resources applicable for the second serving cell. Subframes n, n' and n" are examples of time instants, corresponding to sub-frames discussed in relation to FIG. 6B above, as applicable.

Action 621. The eNB semi-statically configures the UE 110 with K CSI-RS resources corresponding to each cell c of C serving cells.

Action 622. The UE 110 thus receives the configuration of K CSI-RS resources corresponding to each cell c of the C serving cells.

Action 623. The eNB sends grant to the UE 110 on serving cell c, the grant providing a CSI-RS resource identifier R, being an example of the first identifier.

Action 624. The UE 110 thus receives the grant providing the CSI-RS resource identifier R in sub-frame n on serving cell c.

Action 625. The UE 110 may optionally receive the first and the second CSI-RS e.g. according to actions 613-615 above or actions 631-633 in FIG. 6d.

Action 626. The UE 110 further calculates the first CSI report for serving cell c using the CSI-RS resource identifier R.

Action 627. The UE 110 also calculates the second CSI report for serving cell c' other than serving cell c, wherein a CSI-RS resource identifier R', being an example of the second identifier, for cell c' is provided in a sub-frame n' prior to sub-frame n, for example during the configuration of the UE 110 in action 622.

Action 628. The UE 110 transmits the first and second CSI reports in a sub-frame n" following sub-frame n, e.g. within a time interval from sub-frame n.

Action 629. Hence, the eNB receives the CSI reports from the UE 110.

Figure 6D:
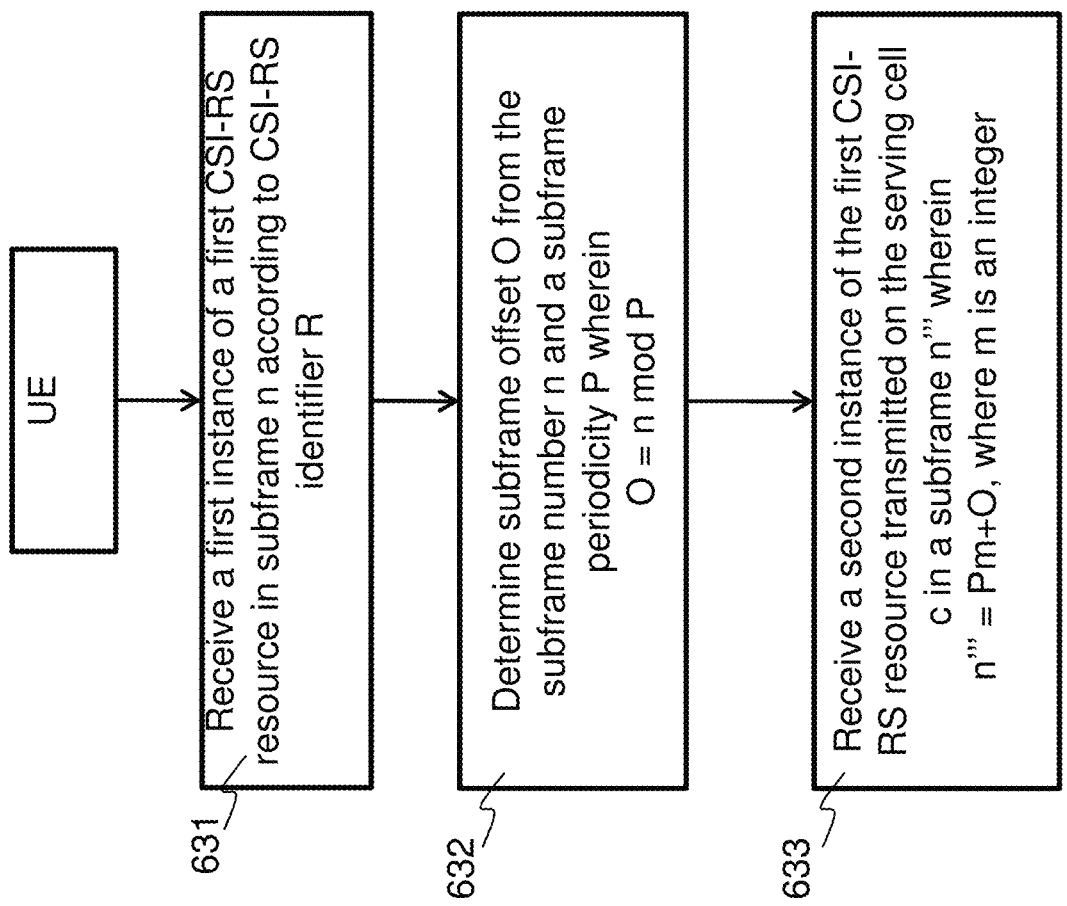
FIG. 6D is a flowchart depicting a method performed by a UE according to embodiments herein.

FIG. 6D is a flowchart depicting actions performed in the user equipment according to some embodiments herein.

Action 631. The UE 110 receives the first instance of the first CSI-RS resource in the sub-frame n according to the CSI-RS identifier R.

Action 632. The UE 110 determines the sub-frame offset O from the sub-frame number n and a sub-frame periodicity P wherein $$O = n \bmod P$$

Action 633. The UE 110 receives the second instance of the first CSI-RS resource transmitted on the serving cell c in a sub-frame n''' wherein $$n''' = Pm + O, \text{ where } m \text{ is an integer}$$

The sub-frame offset for a given CSI-RS may thus be determined when the CSI-RS is triggered, and subsequent reports that do not trigger the CSI-RS again use the sub-frame offset to determine when the CSI-RS is present. Thus, embodiments herein provide an efficient way of determining the first and second CSI-RS resource in time for different cells, and thus improve the performance of the communication network.

It should be noted that in one embodiment the user equipment 110 may receive the configuration of the plurality of CSI-RS resources corresponding to the set of serving cells, the plurality of CSI-RS resources of the configuration comprising CSI-RS resources applicable for the first serving cell and CSI-RS resources applicable for the second serving cell. The UE 110 may then receive CSI-RS on the first instance of the first CSI-RS resource at the first time instant or in the first sub-frame according to the first identifier. The UE 110 may determine the sub-frame offset from the sub-frame number of the first sub-frame and the sub-frame periodicity; and may receive CSI-RS on the second instance of the first CSI-RS resource transmitted on the first serving cell at the second time instant or in the second sub-frame according to the sub-frame offset and the sub-frame periodicity.

Figure 6E:
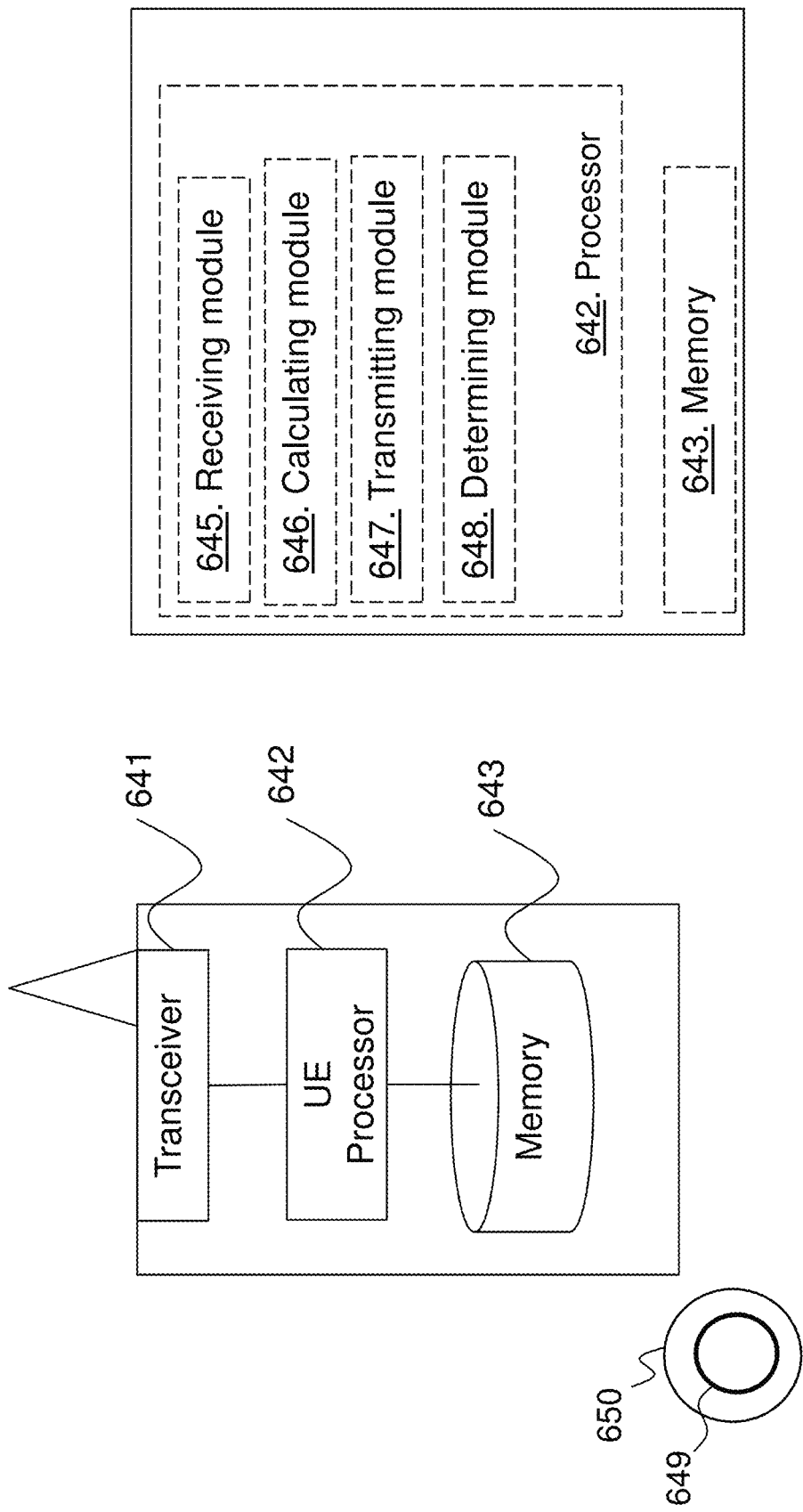
FIG. 6E is a block diagram depicting a UE according to embodiments herein.

FIG. 6E is a block diagram depicting, in two embodiments, the user equipment for handling communication, e.g. handling aperiodic CSI reporting, via the set of serving cells comprising the first serving cell and the second serving cell of the communication network. The user equipment may be configured to be served by the first and second serving cells in the communication network.

The UE 110 may comprise communication interface such as a transceiver 641 for communicating with the network node.

The UE 110 may comprise a processor or UE processor 642 configured to perform the methods herein.

The UE 110 may comprise a memory 643. The memory 643 may comprise one or more units to be used to store data on, such as, instructions, such as a computer program, software, an application including one or more of logic, rules, algorithms, code, tables, etc. and/or other instructions capable of being executed by the processor to perform the methods disclosed herein when being executed, and similar.

The UE 110 may comprise a receiving module 645, e.g. a receiver or a transceiver. The UE 110, the UE processor 642, and/or the receiving module 645 is configured to receive the grant on the first serving cell, wherein the grant comprises the first identifier identifying the at least one CSI-RS resource of the first serving cell. The UE 110, the UE processor 642, and/or the receiving module 645 may be configured to receive the configuration of the plurality of CSI-RS resources corresponding to the set of serving cells, the plurality of CSI-RS resources of the configuration comprising CSI-RS resources applicable for the first serving cell and CSI-RS resources applicable for the second serving cell.

The UE 110 may comprise a calculating module 646. The UE 110, the UE processor 642, and/or the calculating module 646 is configured to calculate the first CSI report for the first serving cell using the at least one CSI-RS resource identified by the first identifier; and to calculate the second CSI report for the second serving cell, using the at least one CSI-RS resource of the second serving cell identified by the second identifier. The second identifier being received previously in a grant on the second serving cell. The second identifier for the second serving cell may be received at a prior time instant, e.g. in a prior sub-frame prior to a first sub-frame or a first time instant where the first identifier of the first serving cell is received. Each one of the first and the second identifiers may identify at least one of: a CSI-RS resource; and a CSI-Interference Measurement (IM) resource.

The UE 110 may comprise a transmitting module 647, e.g. a transmitter or a transceiver. The UE 110, the UE processor 642, and/or the transmitting module 647 is configured to transmit the first and the second CSI reports to the network node serving the first serving cell. The first and second CSI reports are transmitted together in response to an aperiodic CSI report trigger or request triggering the UE to report CSI on more than one cell, e.g. more than one serving cell. The first and second CSI reports may be transmitted at a later time instant, e.g. in a later sub-frame following the first time instant, e.g. the first sub-frame.

In some embodiments, the UE 110, the UE processor 642, and/or the receiving module 645 may be configured to receive CSI-RS on the first instance of the first CSI-RS resource in the first sub-frame according to the first identifier. The UE may comprise a determining module 648. The UE 110, the UE processor 642, and/or the determining module 648 may then be configured to determine the sub-frame offset from the sub-frame number of the first sub-frame and the sub-frame periodicity. Furthermore, the UE 110, the UE processor 642, and/or the receiving module 645 may be configured to receive CSI-RS on the second instance of the first CSI-RS resource transmitted on the first serving cell in the second sub-frame according to the sub-frame offset and the sub-frame periodicity.

The methods according to the embodiments described herein for the UE 110 may be respectively implemented by means of e.g. a computer program 649 or a computer program product, comprising instructions, i.e., software code portions, which, when executed on at least one processor, cause the at least one processor to carry out the actions described herein, as performed by the UE 110. The computer program 649 may be stored on a computer-readable storage medium 650, e.g. a disc, a USB, memory or similar. The computer-readable storage medium 650, having stored thereon the computer program, may comprise the instructions which, when executed on at least one processor, cause the at least one processor to carry out the actions described herein, as performed by the UE 110. In some embodiments, the computer-readable storage medium may be a non-transitory computer-readable storage medium. Thus, the UE 110 may comprise the processor and the memory, said memory comprising instructions executable by said processor whereby said UE 110 is operative to perform the methods herein.

According to certain embodiments, a method for determining a plurality of Channel State Information Reference Signal (CSI-RS) resources in the UE 110, where the CSI-RS resources are transmitted on multiple cells, is provided. The method includes:

receiving a grant on a serving cell, c, in sub-frame n, the grant providing a CSI-RS resource identifier, R;

calculating a first CSI report for serving cell c, using the CSI-RS resource identifier, R;

calculating a second CSI report for a serving cell c' other than serving cell c, wherein a CSI-RS resource identifier R' for cell c' is provided in a sub-frame n' prior to sub-frame n;

transmitting the first and second CSI reports in a sub-frame n'' following sub-frame n;

optionally, the method further comprises:

receiving a first instance of a CSI-RS resource in sub-frame n' according to CSI-RS identifier R';

determining a sub-frame offset, O, from the sub-frame number n' and a sub-frame periodicity, P wherein O=n' mod P; and receiving a second instance of the CSI-RS resource transmitted on the serving cell c' in a sub-frame n''' wherein n'''=Pm+O, where m is an integer;

optionally, the CSI-RS resource configuration identifier identifies one of:

a CSI-RS resource configuration; and a CSI-RS resource configuration and a CSI-IM resource configuration.

Certain embodiments may improve CSI-RS resource allocation efficiency when the UE is configured for downlink carrier aggregation (CA) by semi-persistently assigning CSI-RS resources to the UE 110. When the UE receives a grant transmitted on a cell of a carrier that identifies a CSI-RS resource to use, it uses the CSI-RS resource for that cell when calculating CSI until it receives another grant transmitted on that cell identifying a different CSI-RS resource to use for that cell. In this way, when the UE is triggered to report CSI on more than one cell, the eNB can dynamically allocate CSI-RS resources for cells other than the cell on which the UE receives a grant, even though the grants only allocate CSI-RS resources for a single cell at a time. This increases the number of resources that can be allocated on each cell as compared to when the grants must each indicate resources on multiple cells.

In some embodiments, the UE is configured with K CSI-RS resources corresponding to each cell c of C serving cells, while in others it is configured with K sets of CSI-RS resources corresponding to each cell c of C serving cells. In some 'instant timing' embodiments, the CSI-RS resource configurations or sets of CSI-RS resource configurations identified by a grant may not comprise a CSI-RS sub-frame, but will comprise a CSI-RS periodicity $P_c$ corresponding to the cell c. In these instant timing embodiments, the UE may measure CSI-RS resources in the sub-frame in which the UE receives the grant on the cell c carrying the grant. As such, the sub-frame in which the grant is transmitted may identify the resources to use in the time domain. The UE determines a CSI-RS sub-frame offset $O_c$ corresponding to the cell c from the sub-frame number n in which it receives the grant using $O_c$=n mod($P_c$). When the UE is triggered to report aperiodic CSI for multiple downlink cells, the UE then identifies the location of the CSI-RS resources for cell c in time using the sub-frame offset $O_c$ (as well as the periodicity $P_c$) until a new grant identifying CSI-RS resources is received on cell c. In some embodiments, the value of $P_c$ may be fixed in specification to a single number of sub-frames, such as 5 sub-frames. In some embodiments, the sub-frame number n is the LTE absolute sub-frame number $n_{sf}^{abs}$ that is determined as described in section 4.1 or 4.2 of 3GPP TS 36.211 v13.0.0. In instant timing embodiments, a single CSI-RS resource configuration may be associated with each cell, and the grant identifying the CSI-RS resources to use may not comprise bits identifying which CSI-RS resources are to be used. When the UE receives a grant identifying CSI-RS resources on a cell c, it uses that set of CSI-RS resources in future measurements until it receives a new grant identifying CSI-RS resources for the cell c. In these embodiments, if the UE has not received a grant on cell c, it may use one of the CSI-RS resources associated with cell c by default. This default resource may be a single fixed resource, such as the first CSI-RS resource of the resources associated with cell c, or it may be a CSI-RS resource assigned by higher layer signaling. In instant timing embodiments, this default CSI-RS resource may comprise a default CSI-RS offset $O_c$ and may additionally comprise a default periodicity $P_c$, where the default values of $O_c$ and $P_c$ are configured by higher layer signaling.

Figure 7:
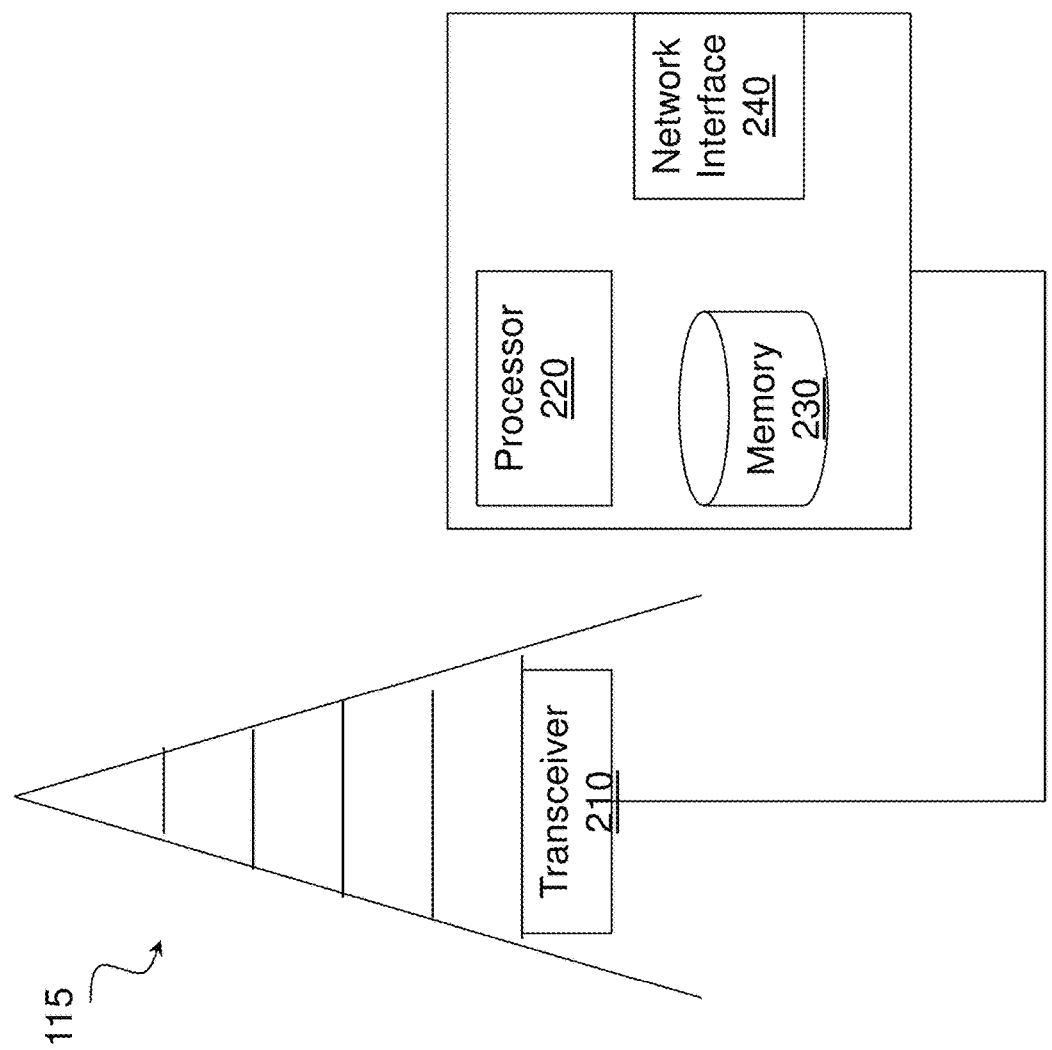
FIG. 7 is a block schematic of an exemplary network node, in accordance with certain embodiments.

FIG. 7 is a block schematic of an exemplary network node 115, in accordance with certain embodiments. As described above, network node 115 may be any type of radio network node or any network node that communicates with a wireless device and/or with another network node. Examples of a network node 115 are provided above.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 210, processor 220, memory 230, and network interface 240. In some embodiments, transceiver 210 facilitates transmitting wireless signals to and receiving wireless signals from wireless device 110 (e.g., via an antenna), processor 220 executes instructions to provide some or all of the functionality described above as being provided by a network node 115, memory 230 stores the instructions executed by processor 220, and network interface 240 communicates signals to backend network components, such as a gateway, switch, router, Internet, Public Switched Telephone Network (PSTN), core network nodes or radio network controllers 130, etc.

In certain embodiments, network node 115 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processor 220 may include any suitable combination of hardware and software implemented in one or more modules to execute instructions and manipulate data to perform some or all of the described functions of network node 115. In some embodiments, processor 1020 may include, for example, one or more computers, one or more central processing units (CPUs), one or more microprocessors, one or more applications, and/or other logic.

Memory 230 is generally operable to store instructions, such as a computer program, software, an application including one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 240 is communicatively coupled to processor 220 and may refer to any suitable device operable to receive input for network node 115, send output from network node 115, perform suitable processing of the input or output or both, communicate to other devices, or any combination of the preceding. Network interface 240 may include appropriate hardware (e.g., port, modem, network interface card, etc.) and software, including protocol conversion and data processing capabilities, to communicate through a network.

Other embodiments of network node 115 may include additional components beyond those shown in FIG. 7 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 8:
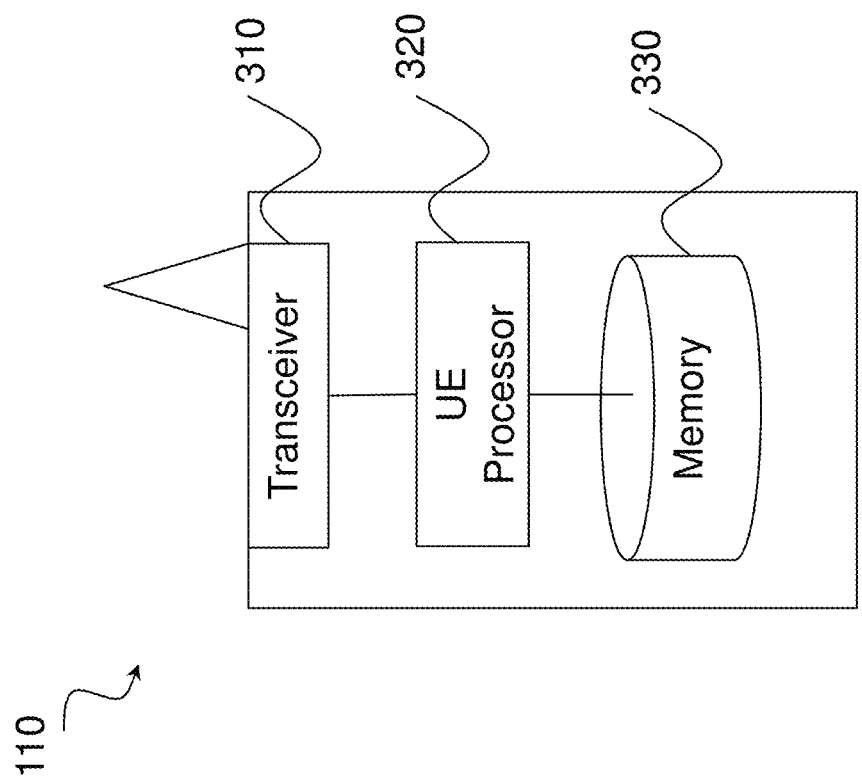
FIG. 8 illustrates an exemplary wireless device, in accordance with certain embodiments.

FIG. 8 is a block schematic of an exemplary wireless device 110, in accordance with certain embodiments. Wireless device 110 may refer to any type of wireless device communicating with a node and/or with another wireless device in a cellular or mobile communication system. As depicted, wireless device 110 includes transceiver 310, processor 320, and memory 330. In some embodiments, transceiver 310 facilitates transmitting wireless signals to and receiving wireless signals from network node 115 (e.g., via an antenna), processor 320 executes instructions to provide some or all of the functionality described above as being provided by wireless device 110, and memory 330 stores the instructions executed by processor 320. Examples of a network node 115 are provided above.

Processor 320 may include any suitable combination of hardware and software implemented in one or more modules to execute instructions and manipulate data to perform some or all of the described functions of wireless device 110. In some embodiments, processor 320 may include, for example, one or more computers, one or more central processing units (CPUs), one or more microprocessors, one or more applications, and/or other logic.

Memory 330 is generally operable to store instructions, such as a computer program, software, an application including one or more of logic, rules, algorithms, code, tables, etc. and/or other instructions capable of being executed by a processor. Examples of memory 1830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 8 that may be responsible for providing certain aspects of the wireless device's functionality, including any of the functionality described above and/or any additional functionality (including any functionality necessary to support the solution described above).

In the existing DCI format 0 and DCI format 4, which is used for sending uplink grants to a UE, there is a cyclic shift field of 3 bits. This field is used to indicate a cyclic shift parameter, $n_{DMRS,\lambda}^{(2)}$, and a length 2 OCC code, $w^\lambda$, where $\lambda=0, 1, \ldots, v-1$ and v is the number of layers to be transmitted in the PUSCH scheduled by the uplink grant. Up to 4 (v=4) layers of PUSCh transmission are supported in the uplink. Each layer has an associated DMRS sequence specified by a cyclic shift and a length 2 OCC code if OCC for DMRS is activated. $n_{DMRS,\lambda}^{(2)}$ is used to derive the cyclic shift of DMRS for PUSCH. The purpose of dynamic signaling of cyclic shifts and OCC code for DMRS is to support uplink multi-user MIMO. UEs schedule together for uplink MU-MIMO can be allocated with different DMRS sequences or different OCC codes through the 3 bits cyclic shift field.

It is herein disclosed, for example, when a pool of multiple CSI-RS resources is shared dynamically by many UEs for aperiodic CSI reporting, an indication in the UL grant containing an aperiodic CSI request is needed to tell the scheduled UE about CSI-RS resource in the resource pool that is to be used for CSI measurement and feedback.

The 3 bits cyclic shift field in DCI formats 0 and 4 may be reused for signaling the CSI-RS resource when an aperiodic CSI report is triggered in the same uplink grant. Let K be the number of CSI-RS resources configured for a UE for aperiodic CSI report and k=0, 1, ..., K−1 be the CSI-RS resource index, then the CSI-RS resource with index k to be used for an aperiodic CSI measurement and report can be signaled by the Cyclic Shift Field in DCI format 0 ('DCI0') and DCI format 4 ('DCI4') as shown in Table 1. The table can also be described by the formula below:

$$k = D \bmod(K)$$

Where D is the decimal value of the Cyclic Shift Field in DCI0 or DCI4 and k is the remainder after division of D by K. Table 1 depicts CSI-RS resource signaling with the existing cyclic shift field in DCI0 and DCI4:

| Cyclic Shift Field in DCI formats 0 and 4 | CSI-RS resource index k | | | | | | |
|---|---|---|---|---|---|---|---|
| | K = 2 | K = 3 | K = 4 | K = 5 | K = 6 | K = 7 | K = 8 |
| 000 | 0 | 0 | 0 | 0 | 0 | 0 | 0 |
| 001 | 1 | 1 | 1 | 1 | 1 | 1 | 1 |
| 010 | 0 | 2 | 2 | 2 | 2 | 2 | 2 |
| 011 | 1 | 0 | 3 | 3 | 3 | 3 | 3 |
| 100 | 0 | 1 | 0 | 4 | 4 | 4 | 4 |
| 101 | 1 | 2 | 1 | 0 | 5 | 5 | 5 |
| 110 | 0 | 0 | 2 | 1 | 0 | 6 | 6 |
| 111 | 1 | 1 | 3 | 2 | 1 | 0 | 7 |

For single user MIMO (that is when eNB only schedules one UE in a given set of PUSCH PRBs on a cell), the DMRS sequences associated to different layers are orthogonal with any allocation of the cyclic field. Thus the allocation of the cyclic shift field can be somewhat arbitrary and a UE can be allocated with any of the 8 values with little performance difference. Therefore, there is little system impact by using the cyclic shift field also for CSI-RS resource indication.

When multiple users are scheduled in the uplink for MU-MIMO, then different cyclic shifts or OCC codes need to be allocated to different UEs for proper channel estimation. In this case, there can be some constraints on the number of UEs can be triggered for aperiodic CSI report in the same sub-frame. For example, if the CSI-RS resource pool has two CSI-RS resources, i.e. K=2, and 8 UEs are co-scheduled for MU-MIMO in a sub-frame. Then according to the K=2 column of Table 3, maximum 4 UEs can be triggered simultaneously for aperiodic CSI report in the same sub-frame and on the same resource, i.e. with k=0 or k=1. However, in practice it is unlikely that more than 4 UEs need to be triggered simultaneously and using the same CSI-RS resource and if it does, the eNB can trigger aperiodic CSI reports for other UEs in a different sub-frame. Therefore, such reuse of the cyclic field for CSI-RS resource indication has little impact on UL MU-MIMO scheduling.

Figure 9:
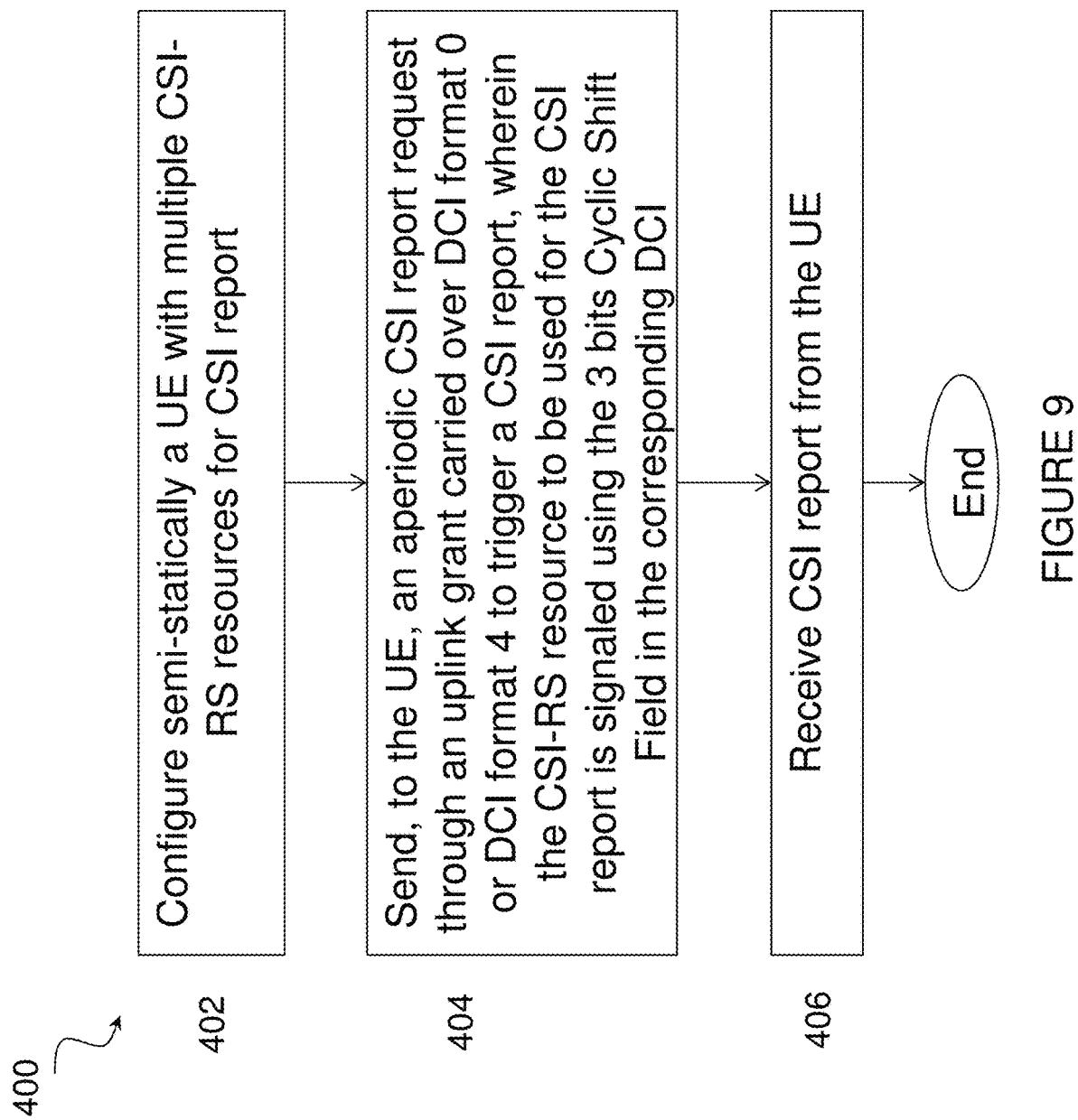
FIG. 9 is a flow diagram of a method in a network node, in accordance with certain embodiments.

FIG. 9 illustrates a flow diagram of a method 400 in a network node 115. The method begins at step 402 when the network node 115, which may include an eNB, configures semi-statically a UE with multiple CSI-RS resources for CSI report.

At step 404, the network node 115 sends to the UE 110 an aperiodic CSI report request through an uplink grant carried over DCI format 0 or DCI format 4 to trigger a CSI report. The CSI-RS resource to be used for the CSI report is signaled using the 3 bits Cyclic Shift Field in the corresponding DCI.

At step 406, the network node 115 receives the CSI report from the UE.

In examples herein, a computer networking virtual apparatus configuring a UE with multiple CSI-RS resource configurations may perform steps similar to those described above with regard to the method illustrated and described in FIG. 9. For example, a computer networking virtual apparatus may include a configuring module, a sending or transmitting module, a receiving module, and any other suitable modules for configuring a UE with multiple CSI-RS resource configurations. In some embodiments, one or more of the modules may be implemented using one or more processors 220 of FIG. 7. In certain embodiments, the functions of two or more of the various modules may be combined into a single module. Other examples herein of the computer networking virtual, apparatus may include additional components for performing operations beyond those shown in FIG. 7 that may be responsible for providing certain aspects of the functionality of network node 115, including any of the functionality described above and/or any additional functionality (including any functionality necessary to support the solutions described above). The various different types of network nodes 115 may include components having the same physical hardware but configured (e.g., via programming) to support different radio access technologies, or may represent partly or entirely different physical components.

Figure 10:
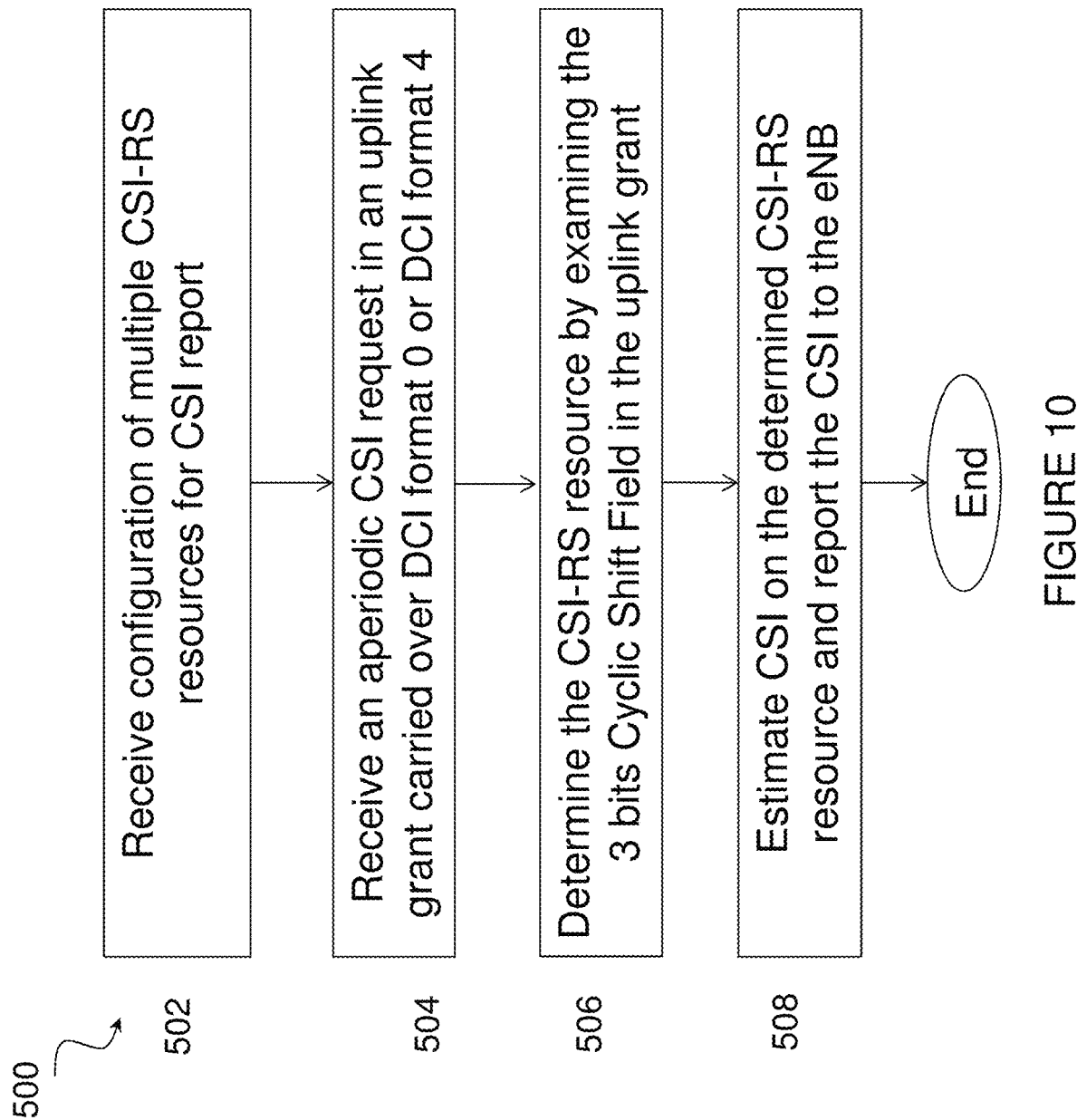
FIG. 10 is a flow diagram of a method in a wireless device, in accordance with certain embodiments.

FIG. 10 illustrates a flow diagram of a method 500 in a wireless device 115 for being configured with multiple CSI-RS resource configurations, in accordance with certain examples herein. The method begins at step 502 when UE 110 receives configuration of multiple CSI-RS resources for CSI report.

At step 504, the UE receives an aperiodic CSI request in an uplink grant carried over DCI format 0 or DCI format 4. The UE may determine the CSI-RS resource by examining the Cyclic Shift Field in the uplink grant at step 506.

At step 508, the UE estimates SI on the determined CSI-RS resource and reports the DCSi to the eNB.

In certain examples herein, a computer networking virtual apparatus for being configured with multiple CSI-RS resource configurations may perform steps similar to those described above with regard to the method illustrated and described in FIG. 10. For example, a computer networking virtual apparatus may include a receiving module, a determining module, an estimating module, a reporting module, and any other suitable modules for being configured for multiple CSI-RS resource configurations. In some examples herein, one or more of the modules may be implemented using one or more processors 320 of FIG. 8. In certain embodiments, the functions of two or more of the various modules may be combined into a single module. Other embodiments of the computer networking virtual apparatus may include additional components for performing operations beyond those shown in FIG. 10 that may be responsible for providing certain aspects of the functionality of wireless device 110, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

In another scenario, a UE may be configured with K sets of CSI resources. Each set of CSI resources consists of a CSI-RS resource and a CSI-IM resource. A UE may be required to measure and report CSI based on one of the K sets of CSI resources. In this case, the set of CSI resources with index k to be used for an aperiodic CSI measurement and report can be similarly signaled with the existing Cyclic Shift Field in DCI0 and DCI4 as shown in Table 4:

TABLE 4

| Cyclic Shift Field in DCI formats 0 and 4 | CSI resource set index k | | | | | | |
|---|---|---|---|---|---|---|---|
| | K = 2 | K = 3 | K = 4 | K = 5 | K = 6 | K = 7 | K = 8 |
| 000 | 0 | 0 | 0 | 0 | 0 | 0 | 0 |
| 001 | 1 | 1 | 1 | 1 | 1 | 1 | 1 |
| 010 | 0 | 2 | 2 | 2 | 2 | 2 | 2 |
| 011 | 1 | 0 | 3 | 3 | 3 | 3 | 3 |
| 100 | 0 | 1 | 0 | 4 | 4 | 4 | 4 |
| 101 | 1 | 2 | 1 | 0 | 5 | 5 | 5 |
| 110 | 0 | 0 | 2 | 1 | 0 | 6 | 6 |
| 111 | 1 | 1 | 3 | 2 | 1 | 0 | 7 |

In yet another scenario, a UE may be configured with K sets of CSI resources. Each set of CSI resources consists of multiple pairs of CSI-RS and CSI-IM resources. A UE may be requested to report multiple CSIs based on each set of CSI resource. For example, a UE may be configured with K=2 sets of CSI resources, where each contains two pairs of CSI-RS and CSI-IM resources:

k=0: (CSI-RS resource index 0, CSI-IM resource index 0), (CSI-RS resource index 0, CSI-IM resource index 1), k=1: (CSI-RS resource index 1, CSI-IM resource index 1), (CSI-RS resource index 1, CSI-IM resource index 0), The UE may be triggered for an aperiodic CSI report based on the set of CSI resources with index of either k=0 or k=1.

Figure 11:
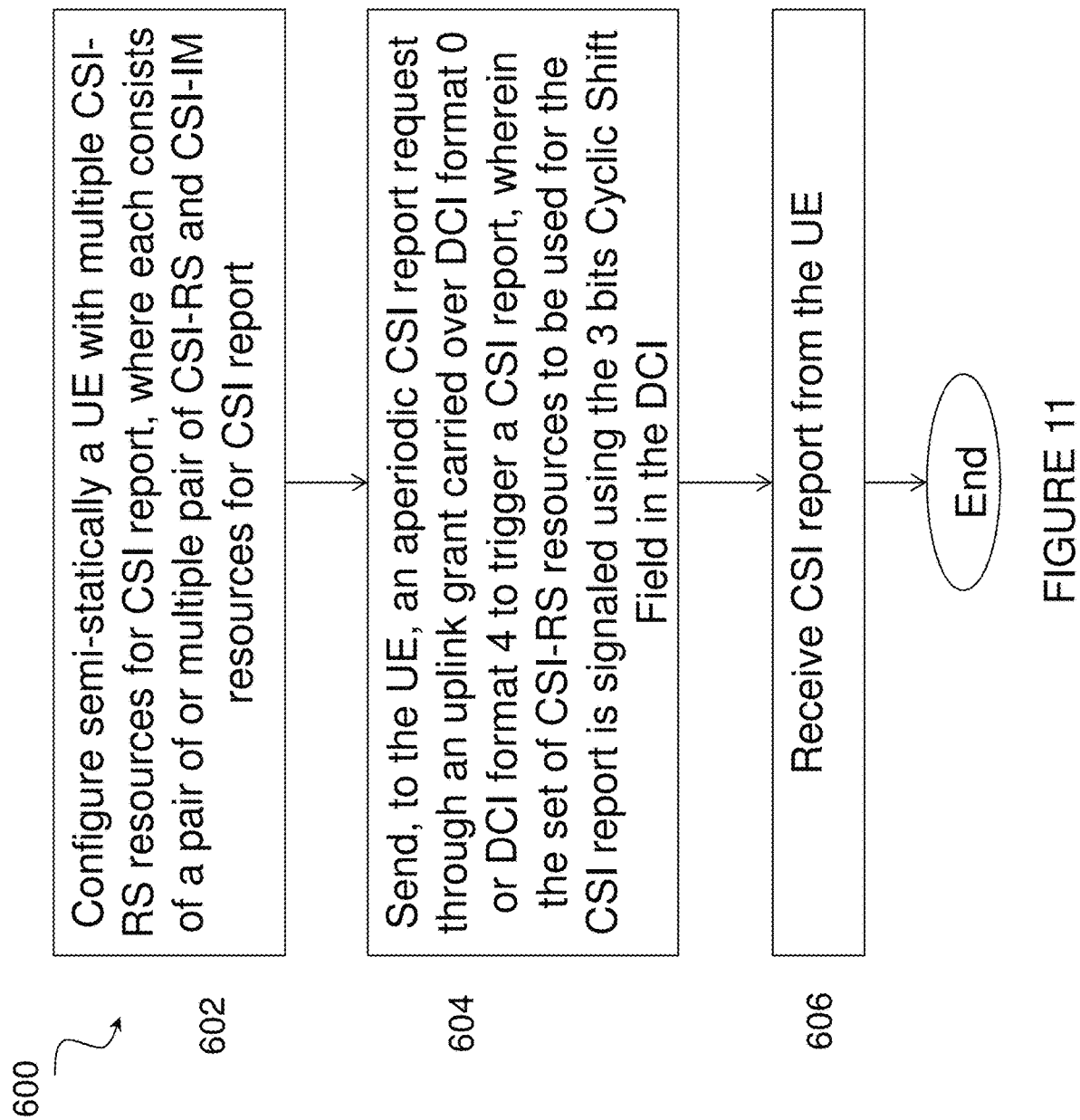
FIG. 11 is a flow diagram of a method in a network node, in accordance with certain embodiments.

FIG. 11 illustrates a flow diagram of a method 600 in a network node 115 for configuring a UE with multiple CSI-RS resource configurations, in accordance with certain examples herein. The method begins at step 602 when network node 115 configures semi-statically a UE with multiple CSI-RS resources for CSI report.

At step 604, the network node 115 send to UE 110 an aperiodic CSI report request through an uplink grant carried over DCI format 0 or DCI format 4 to trigger a CSI report. The CSI-RS resource to be used for the CSI report is signaled using the 3 bit Cyclic Shift Field in the corresponding DCI.

At step 606, the network node 115 receives the CSI report from UE 110.

In certain examples herein, a computer networking virtual apparatus for configuring a UE with multiple CSI-RS resource configurations may perform steps similar to those described above with regard to the method illustrated and described in FIG. 11. For example, a computer networking virtual apparatus may include a configuring module, a sending or transmitting module, a receiving module, and any other suitable modules for configuring a UE with multiple CSI-RS resource configurations. In some embodiments, one or more of the modules may be implemented using one or more processors 220 of FIG. 7. In certain embodiments, the functions of two or more of the various modules may be combined into a single module. Other examples herein of the computer networking virtual apparatus may include additional components beyond those shown in FIG. 11 that may be responsible for providing certain aspects of the functionality of network node 115, including any of the functionality described above and/or any additional functionality (including any functionality necessary to support the solutions described above). The various different types of network nodes 115 may include components having the same physical hardware but configured (e.g., via programming) to support different radio access technologies, or may represent partly or entirely different physical components.

Figure 12:
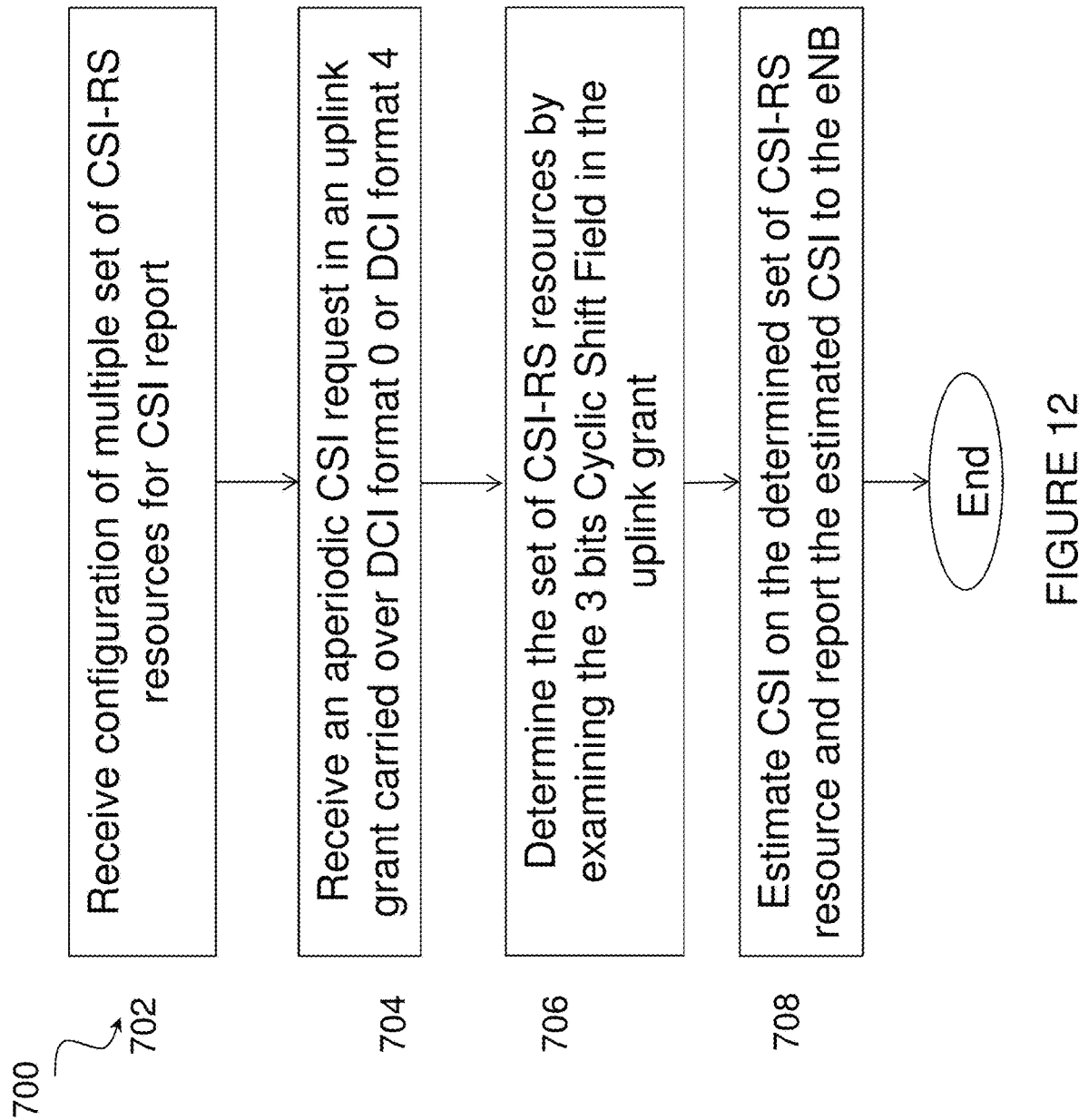
FIG. 12 is a flow diagram of a method in a wireless device, in accordance with certain embodiments.

FIG. 12 illustrates a flow diagram of a method 700 in a wireless device 115 for being configured with multiple CSI-RS resource configurations, in accordance with certain examples herein. The method begins at step 702 when UE 110 receives configuration for multiple CSI-RS resources for CSI report.

At step 704, UE 110 receives an aperiodic CSI request in an uplink grant carried over DCI format 0 or DCI format 4. UE 110 may determine the CSI-RS resource by examining the 3 bit Cyclic Shift Field in the uplink grant at step 706.

At step 708, UE 110 estimates CSI on the determined CSI-RS resource and reports the CSI to the network node 115.

In certain examples herein, a computer networking virtual apparatus for being configured with multiple CSI-RS resource configurations may perform steps similar to those described above with regard to the method illustrated and described in FIG. 12. For example, a computer networking virtual apparatus for being configured with multiple CSI-RS resource configurations may include a receiving module, a determining module, an estimating module, a reporting module, and any other suitable modules for being configured with multiple CSI-RS configurations. In some embodiments, one or more of the modules may be implemented using one or more processors 320 of FIG. 8. In certain embodiments, the functions of two or more of the various modules may be combined into a single module. Other examples herein of the computer networking virtual apparatus may include additional components beyond those shown in FIG. 12 that may be responsible for providing certain aspects of the functionality of wireless device 110, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 13:
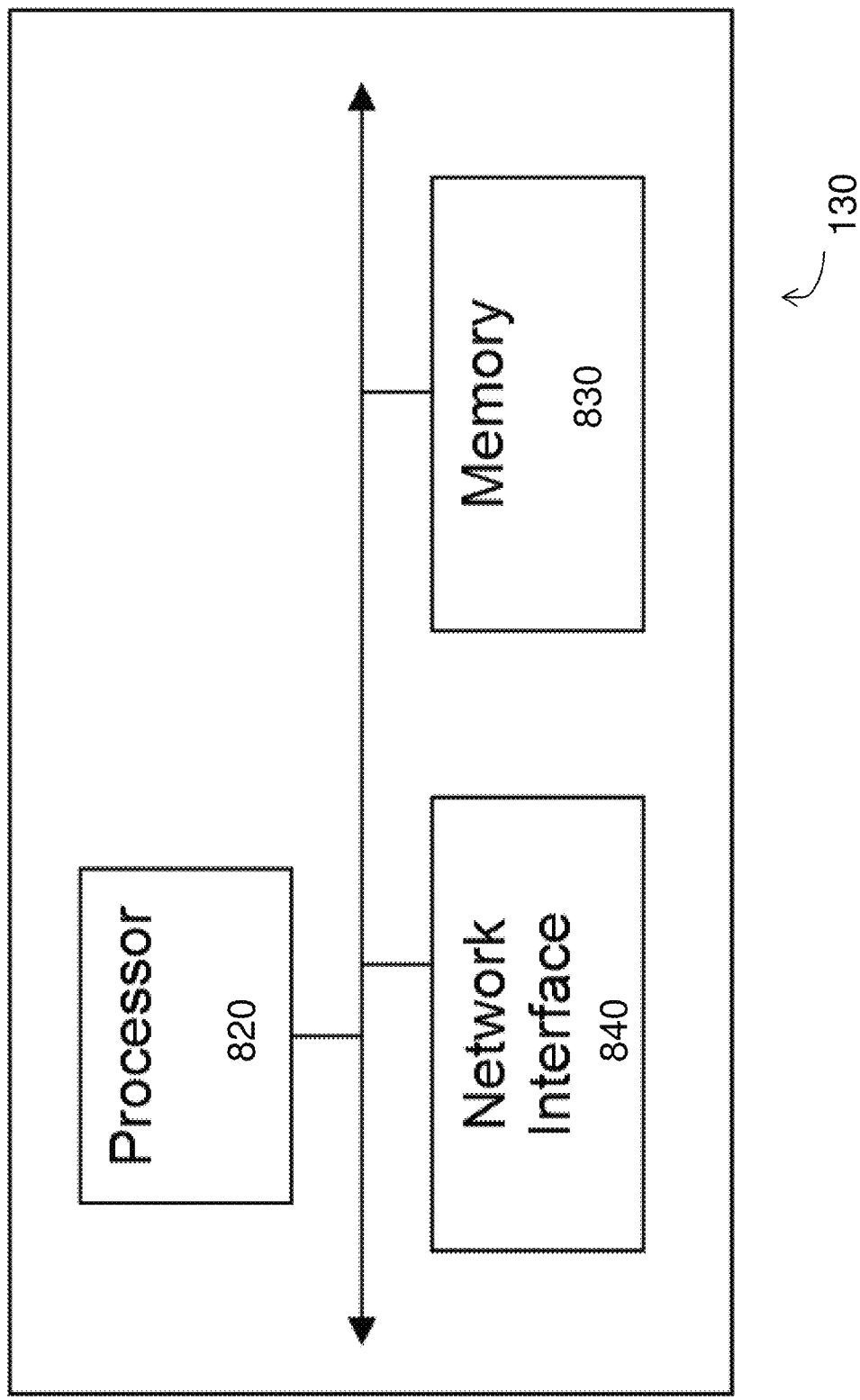
FIG. 13 is a block schematic of an exemplary radio network controller or core network node, in accordance with certain embodiments.

FIG. 13 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 820, memory 830, and network interface 840. In some embodiments, processor 820 executes instructions to provide some or all of the functionality described above as being provided by the network node, memory 830 stores the instructions executed by processor 820, and network interface 840 communicates signals to any suitable node, such as a gateway, switch, router, Internet, Public Switched Telephone Network (PSTN), network nodes 115, radio network controllers or core network nodes 130, etc.

Processor 820 may include any suitable combination of hardware and software implemented in one or more modules to execute instructions and manipulate data to perform some or all of the described functions of the radio network controller or core network node 130. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for the network node, send output from the network node, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of the network node may include additional components beyond those shown in FIG. 13 that may be responsible for providing certain aspects of the network node's functionality, including any of the functionality described above and/or any additional functionality (including any functionality necessary to support the solution described above).

It is herein disclosed a method for identifying a Channel State Information Reference Signal (CSI-RS) resource for CSI measurement and reporting is provided. The method includes:
  semi-statically configuring, by a network node, a UE with a plurality of CSI-RS resources or a plurality of sets of CSI-RS and CSI interference measurement (CSI-IM) resources;
  dynamically signaling, to the UE, a parameter in a downlink control channel for uplink data scheduling on a physical uplink shared channel (PUSCH), wherein the parameter simultaneously identifies:
    a characteristic of demodulation reference signal (DMRS) associated with the PUSCH, and
    a CSI-RS resource configuration identifier to measure when calculating a CSI report.
  optionally, the characteristic is a cyclic shift;
  optionally, the CSI-RS resource configuration identifier identifies one of:
    a CSI-RS resource configuration; and
    a CSI-RS resource configuration and a CSI-IM resource configuration.

According to embodiments herein, a method for determining a plurality of Channel State Information Reference Signal (CSI-RS) resources in a UE, where the CSI-RS resources are transmitted on multiple cells, may be provided. The method may include:
  receiving a grant on a serving cell, c, in sub-frame n, the grant providing a CSI-RS resource identifier, R;
  calculating a first CSI report for serving cell c, using the CSI-RS resource identifier, R;
  calculating a second CSI report for a serving cell c' other than serving cell c, wherein a CSI-RS resource identifier R' for cell c' is provided in a sub-frame n' prior to sub-frame n;
  transmitting the first and second CSI reports in a sub-frame n" following sub-frame n;
  optionally, the method further comprises:
    receiving a first instance of a CSI-RS resource in sub-frame n' according to CSI-RS identifier R';
    determining a sub-frame offset, O, from the sub-frame number n' and a sub-frame periodicity, P wherein O=n' mod P; and
    receiving a second instance of the CSI-RS resource transmitted on the serving cell c in a sub-frame n'" wherein n'"=Pm+O, where m is an integer;
  optionally, the CSI-RS resource configuration identifier identifies one of:
    a CSI-RS resource configuration; and
    a CSI-RS resource configuration and a CSI-IM resource configuration.

Certain embodiments may provide one or more technical advantages. As one example, one benefit of certain embodiments may be that there is no additional overhead to identify the CSI-RS resource to measure in an aperiodic CSI reporting request. Another technical advantage of certain embodiments may be that CSI-RS resource allocation efficiency is increased when the UE reports CSI for multiple downlink cells. These benefits translate to lower downlink overhead, and therefore more resources available for downlink transmission. Another benefit of some embodiments is that UE CSI computational complexity to compute CSI reports for multiple cells is reduced. Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

Abbreviations used in the preceding description include:
ARQ Automatic Retransmission Request
CQI Channel Quality Indicators
CSI Channel State Information
CSI-RS Channel State Information Reference Signals
DFT Discrete Fourier Transform
LTE Long Term Evolution
MIMO Multiple Input Multiple Output
OCC Orthogonal Cover Code
OFDM Orthogonal Frequency Division Multiplexing
PMI Precoding Matrix Indicator
PUCCH Physical Uplink Control Channel
RI Rank Indicator
SINR Signal to Interference plus Noise Ratio
TFRE Time Frequency Resource Element
UE User Equipment

The invention claimed is:

1. A method performed by a user equipment for handling communication via a set of serving cells comprising a first serving cell and a second serving cell of a communication network, the method comprising:
  receiving a first uplink grant on the first serving cell, wherein the first uplink grant comprises a first identifier identifying at least one semi-persistent Channel State Information Reference Signal (CSI-RS) resource of the first serving cell, the first uplink grant for the first serving cell including an indication triggering an aperiodic CSI report for CSI for the first serving cell and the second serving cell;

receiving, in the first serving cell, a first CSI-RS in a first CSI-RS semi-persistent resource identified by the first identifier;

calculating a first CSI report for the first serving cell based on the first CSI-RS received in the first using semi-persistent CSI-RS resource identified by the first identifier;

receiving, in the second serving cell, a second CSI-RS in a second semi-persistent CSI-RS resource identified by a second identifier, the second identifier being received previously in a second uplink grant on the second serving cell;

calculating a second CSI report for the second serving cell based on the second CSI-RS received in the second semi-persistent CSI-RS resource of the second serving cell identified by the second identifier; and transmitting the first and second CSI reports to a network node serving the first serving cell.

2. The method according to claim 1, wherein the second identifier for the second serving cell is received in a prior sub-frame prior to a first sub-frame where the first identifier of the first serving cell is received.

3. The method according to claim 2, wherein the first and second CSI reports are transmitted in a later sub-frame following the first sub-frame.

4. The method according to claim 1, further comprising
receiving a configuration of a plurality of CSI-RS resources corresponding to the set of serving cells, the plurality of CSI-RS resources of the configuration comprising semi-persistent CSI-RS resources applicable for the first serving cell and semi-persistent CSI-RS resources applicable for the second serving cell.

5. The method according to claim 1, wherein each one of the first and the second identifiers identifies at least one of:
a CSI-RS resource; and
a CSI-Interference Measurement (IM) resource.

6. The method according to claim 1, comprising
receiving CSI-RS on a first instance of the first semi-persistent CSI-RS resource in a first sub-frame according to the first identifier;
determining a sub-frame offset from a sub-frame number of the first sub-frame and a sub-frame periodicity; and
receiving CSI-RS on a second instance of the first semi-persistent CSI-RS resource transmitted on the first serving cell in a second sub-frame according to the sub-frame offset and the sub-frame periodicity.

7. A user equipment for handling communication via a set of serving cells comprising a first serving cell and a second serving cell of a communication network, the user equipment being configured to
receive a first uplink grant on the first serving cell, wherein the first uplink grant comprises a first identifier identifying at least one semi-persistent Channel State Information Reference Signal (CSI-RS) resource of the first serving cell, the first uplink grant for the first serving cell including an indication triggering an aperiodic CSI report for CSI for the first serving cell and the second serving cell;
receiving, in the first serving cell, a first CSI-RS in a first CSI-RS semi-persistent resource identified by the first identifier;

calculate a first CSI report for the first serving cell based on the first CSI-RS received in the first semi-persistent CSI-RS resource identified by the first identifier;

receiving, in the second serving cell, a second CSI-RS in a second semi-persistent CSI-RS resource identified by a second identifier, the second identifier being received previously in a second uplink grant on the second serving cell;

calculate a second CSI report for the second serving cell based on the second CSI-RS received in the second semi-persistent CSI-RS resource of the second serving cell identified by the second identifier; and transmit the first and second CSI reports to a network node serving the first serving cell.

8. The user equipment according to claim 7, wherein the second identifier for the second serving cell is received in a prior sub-frame prior to a first sub-frame where the first identifier of the first serving cell is received.

9. The user equipment according to claim 8, wherein the first and second CSI reports are transmitted in a later sub-frame following the first sub-frame.

10. The user equipment according to claim 7, further being configured to
receive a configuration of a plurality of CSI-RS resources corresponding to the set of serving cells, the plurality of CSI-RS resources of the configuration comprising semi-persistent CSI-RS resources applicable for the first serving cell and semi-persistent CSI-RS resources applicable for the second serving cell.

11. The user equipment according to claim 7, wherein each one of the first and the second identifiers identifies at least one of:
a CSI-RS resource; and
a CSI-Interference Measurement (IM) resource.

12. The user equipment according to claim 7, further being configured to:
receive CSI-RS on a first instance of the first semi-persistent CSI-RS resource in a first sub-frame according to the first identifier;
determine a sub-frame offset from a sub-frame number of the first sub-frame and a sub-frame periodicity; and to
receive CSI-RS on a second instance of the first semi-persistent CSI-RS resource transmitted on the first serving cell in a second sub-frame according to the sub-frame offset and the sub-frame periodicity.

13. A non-transitory computer-readable storage medium, having stored thereon a computer program comprising instructions which, when executed on at least one processor, cause the at least one processor to:
receive a first uplink grant on the first serving cell, wherein the first uplink grant comprises a first identifier identifying at least one semi-persistent Channel State Information Reference Signal (CSI-RS) resource of the first serving cell, the first uplink grant for the first serving cell including an indication triggering an aperiodic CSI report for CSI for the first serving cell and the second serving cell;
receive, in the first serving cell, a first CSI-RS in a first CSI-RS semi-persistent resource identified by the first identifier;
calculate a first CSI report for the first serving cell based on the first CSI-RS received in the first semi-persistent CSI-RS resource identified by the first identifier;
receiving the second serving cell, a second CSI-RS in a second semi-persistent CSI-RS resource identified by a second identifier, the second identifier being received previously in a second uplink grant on the second serving cell;

calculate a second CSI report for the second serving cell based on the second CSI-RS received in the second semi-persistent CSI-RS resource of the second serving cell identified by the second identifier; and transmit the first and second CSI reports to a network node serving the first serving cell.

\* \* \* \* \*